(12) United States Patent
Marjanovic et al.

(10) Patent No.: US 10,392,290 B2
(45) Date of Patent: Aug. 27, 2019

(54) PROCESSING 3D SHAPED TRANSPARENT BRITTLE SUBSTRATE

(71) Applicant: Corning Incorporated, Corning, NY (US)

(72) Inventors: Sasha Marjanovic, Painted Post, NY (US); Albert Roth Nieber, Painted Post, NY (US); Garrett Andrew Piech, Corning, NY (US); Sergio Tsuda, Horseheads, NY (US); Robert Stephen Wagner, Corning, NY (US)

(73) Assignee: Corning Incorporated, Corning, NY (US)

( * ) Notice: Subject to any disclaimer, the term of this patent is extended or adjusted under 35 U.S.C. 154(b) by 21 days.

(21) Appl. No.: 15/662,788

(22) Filed: Jul. 28, 2017

(65) Prior Publication Data
US 2018/0029920 A1    Feb. 1, 2018

Related U.S. Application Data

(62) Division of application No. 14/530,379, filed on Oct. 31, 2014, now Pat. No. 9,815,730.
(Continued)

(51) Int. Cl.
*C03B 23/02*     (2006.01)
*C03B 33/09*     (2006.01)
(Continued)

(52) U.S. Cl.
CPC ........ *C03B 33/091* (2013.01); *B23K 26/0622* (2015.10); *B23K 26/0624* (2015.10);
(Continued)

(58) Field of Classification Search
USPC .............................................. 428/43; 65/105
See application file for complete search history.

(56) References Cited

U.S. PATENT DOCUMENTS

| 1,790,397 A | 1/1931 | Woods et al. |
| 2,682,134 A | 6/1954 | Stookey |

(Continued)

FOREIGN PATENT DOCUMENTS

| CN | 2388062 Y | 7/2000 |
| CN | 1283409 C | 11/2006 |

(Continued)

OTHER PUBLICATIONS

McGloin et al."Bessel beams: diffraction in a new light" Contemporary Physics, vol. 46 No. 1 (2005) pp. 15-28.
(Continued)

*Primary Examiner* — Mark Halpern
(74) *Attorney, Agent, or Firm* — Kevin L. Bray

(57) ABSTRACT

Methods are provided for laser processing arbitrary shapes of molded 3D thin transparent brittle parts from substrates with particular interest in substrates formed from strengthened or non-strengthened Corning Gorilla® glass (all codes). The developed laser methods can be tailored for manual separation of the parts from the panel or full laser separation by thermal stressing the desired profile. Methods can be used to form 3D surfaces with small radii of curvature. The method involves the utilization of an ultra-short pulse laser that may be optionally followed by a $CO_2$ laser for fully automated separation.

7 Claims, 21 Drawing Sheets

Related U.S. Application Data

(60) Provisional application No. 61/917,127, filed on Dec. 17, 2013, provisional application No. 62/024,581, filed on Jul. 15, 2014, provisional application No. 62/046,360, filed on Sep. 5, 2014.

(51) Int. Cl.

| | | |
|---|---|---|
| *C03B 33/02* | (2006.01) | |
| *C03B 33/08* | (2006.01) | |
| *C03B 33/10* | (2006.01) | |
| *B23K 26/359* | (2014.01) | |
| *C03B 33/033* | (2006.01) | |
| *C03B 23/023* | (2006.01) | |
| *C03B 23/025* | (2006.01) | |
| *B23K 26/402* | (2014.01) | |
| *B23K 26/0622* | (2014.01) | |
| *B23K 26/53* | (2014.01) | |
| *B23K 26/08* | (2014.01) | |
| *B23K 103/00* | (2006.01) | |
| *B23K 103/16* | (2006.01) | |
| *C03B 33/023* | (2006.01) | |
| *C03B 33/04* | (2006.01) | |

(52) U.S. Cl.
CPC ........ *B23K 26/0884* (2013.01); *B23K 26/359* (2015.10); *B23K 26/402* (2013.01); *B23K 26/53* (2015.10); *C03B 23/02* (2013.01); *C03B 23/023* (2013.01); *C03B 23/025* (2013.01); *C03B 33/0222* (2013.01); *C03B 33/033* (2013.01); *C03B 33/082* (2013.01); *C03B 33/102* (2013.01); *B23K 2103/172* (2018.08); *B23K 2103/50* (2018.08); *B23K 2103/54* (2018.08); *B65G 2249/04* (2013.01); *C03B 33/023* (2013.01); *C03B 33/04* (2013.01); *Y02P 40/57* (2015.11); *Y10T 428/15* (2015.01); *Y10T 428/24777* (2015.01)

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett |
| 5,400,350 A | 3/1995 | Galvanauskas et al. |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokayama |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,038,055 A | 3/2000 | Hansch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,744,009 B1 | 6/2004 | Xuan et al. |
| 6,787,732 B1 | 9/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,061,583 B2 | 6/2006 | Mulkens et al. |
| 7,353,829 B1 | 4/2008 | Wachter et al. |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |

(56) References Cited

U.S. PATENT DOCUMENTS

| | | |
|---|---|---|
| 8,943,855 B2 | 2/2015 | Gomez et al. |
| 8,951,889 B2 | 2/2015 | Ryu et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2004/0021615 A1 | 11/2004 | Postupack et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2006/0011593 A1 | 1/2006 | Fukuyo |
| 2006/0109874 A1 | 5/2006 | Shiozaki et al. |
| 2006/0127679 A1 | 6/2006 | Gulati et al. |
| 2006/0151450 A1 | 7/2006 | You et al. |
| 2006/0227440 A1 | 10/2006 | Glukstad |
| 2006/0289410 A1 | 12/2006 | Morita et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0206008 A1* | 8/2010 | Harvey ............... C03B 33/0222 65/105 |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0291353 A1* | 11/2010 | Dejneka ............... C03B 33/0222 428/192 |
| 2010/0320179 A1 | 12/2010 | Morita et al. |
| 2010/0326138 A1 | 12/2010 | Kumatani et al. |
| 2011/0049764 A1 | 3/2011 | Lee et al. |
| 2011/0049765 A1 | 3/2011 | Lei et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0183116 A1 | 7/2011 | Hung et al. |
| 2011/0240611 A1 | 10/2011 | Sandstrom et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0205356 A1 | 8/2012 | Pluss |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fujii et al. |
| 2013/0122264 A1 | 5/2013 | Fujii et al. |
| 2013/0126573 A1 | 5/2013 | Hosseini et al. |
| 2013/0129947 A1* | 5/2013 | Harvey ............... C03B 33/091 428/34.4 |
| 2013/0133367 A1 | 5/2013 | Abramov et al. |
| 2013/0216573 A1 | 5/2013 | Hosseini et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Wiegel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | Desimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |

(56) References Cited

U.S. PATENT DOCUMENTS

| | | |
|---|---|---|
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0367442 A1 | 12/2015 | Bovatsek et al. |
| 2016/0008927 A1 | 1/2016 | Grundmueller et al. |
| 2016/0009066 A1 | 1/2016 | Neiber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0280580 A1 | 9/2016 | Bohme |
| 2016/0290791 A1 | 10/2016 | Buono et al. |
| 2017/0169847 A1 | 6/2017 | Tamaki |

FOREIGN PATENT DOCUMENTS

| | | |
|---|---|---|
| CN | 101386466 A | 3/2009 |
| CN | 101502914 A | 8/2009 |
| CN | 201357287 Y | 12/2009 |
| CN | 101637849 A | 2/2010 |
| CN | 201471092 U | 5/2010 |
| CN | 102060437 A | 5/2011 |
| CN | 102248302 A | 11/2011 |
| CN | 102343631 A | 2/2012 |
| CN | 102649199 A | 8/2012 |
| CN | 102672355 A | 9/2012 |
| CN | 102898014 A | 1/2013 |
| CN | 102916081 A | 2/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 10346027 A | 4/2014 |
| CN | 203509350 U | 4/2014 |
| CN | 104344202 A | 2/2015 |
| DE | 2231330 A1 | 1/1974 |
| DE | 10200635555 A1 | 1/2008 |
| DE | 102012010635 A1 | 11/2013 |
| DE | 102013223637 A1 | 5/2015 |
| EP | 0270897 A1 | 6/1988 |
| EP | 0609978 A1 | 8/1994 |
| EP | 1159104 B1 | 8/2004 |
| EP | 2202545 A1 | 6/2010 |
| EP | 2783784 A2 | 10/2014 |
| FR | 298294 A1 | 10/2013 |
| GB | 1242172 | 8/1971 |
| JP | 1179770 A | 7/1989 |
| JP | 6318756 A | 11/1994 |
| JP | 09106243 A | 4/1997 |
| JP | 11269683 A | 10/1999 |
| JP | 11347758 A | 12/1999 |
| JP | 2001138083 A | 5/2001 |
| JP | 2002228818 A | 8/2002 |
| JP | 2003062756 A | 3/2003 |
| JP | 2003114400 A | 4/2003 |
| JP | 2003154517 A | 5/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 2006130691 A | 5/2006 |
| JP | 2006248885 A | 9/2006 |
| JP | 2007021548 A | 2/2007 |
| JP | 2007253203 A | 10/2007 |
| JP | 2009056482 | 3/2009 |
| JP | 2010046761 A | 3/2010 |
| JP | 04592855 B2 | 12/2010 |
| JP | 2011049398 A | 3/2011 |
| JP | 04672689 B2 | 4/2011 |
| JP | 04880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 05274085 B2 | 8/2013 |
| JP | 05300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2009057161 A | 6/2009 |
| KR | 1020621 B1 | 3/2011 |
| KR | 2012015366 A | 2/2012 |
| KR | 2012074508 A | 7/2012 |
| KR | 2013031380 A | 3/2013 |
| KR | 1269474 B1 | 5/2013 |
| KR | 2013124646 A | 11/2013 |
| KR | 1344368 B1 | 12/2013 |
| KR | 2014022980 A | 2/2014 |
| KR | 2014022981 A | 2/2014 |
| KR | 1020140064220 A | 5/2014 |
| TW | 201226345 A | 7/2012 |
| WO | 1999029243 A1 | 6/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2011056781 A1 | 5/2011 |
| WO | 2012006736 A2 | 1/2012 |
| WO | 2012166753 A2 | 6/2012 |
| WO | 2012108052 A1 | 8/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014064492 A1 | 5/2014 |
| WO | 2014079478 A1 | 5/2014 |
| WO | 2014079570 A1 | 5/2014 |
| WO | 2015127583 A1 | 9/2015 |
| WO | 2016005455 A1 | 1/2016 |
| WO | 2016010954 A2 | 1/2016 |
| WO | 2016154284 A1 | 9/2016 |

OTHER PUBLICATIONS

Merola et al. "Characterization of Bessel beams generated by polymeric microaxicons" Meas. Sci. Technol. 23 (2012) 10 pgs.

Mirkhalaf, M. et al., Overcoming the brittleness of glass through bio-inspiration and micro-achitecture, Nature Communications, 5:3166/ncomm4166(2014).

Perry et al., "Ultrashort-pulse laser machining of dielectric materials"; Journal of Applied Physics, vol. 85, No. 9, May 1, 1999, American Institute of Physics, pp. 6803-6810.

Perry et al., "Ultrashort-pulse laser machining"; UCRL-ID-132159, Sep. 1998, pp. 1-38.

(56) References Cited

OTHER PUBLICATIONS

Perry et al., "Ultrashort-pulse laser machining"; UCRL-JC-132159 Rev 1., Jan. 22, 1999, pp. 1-24.
Polynkin et al., "Extended filamentation with temporally chirped femtosecond Bessel-Gauss beams in air"; Optics Express, vol. 17, No. 2, Jan. 19, 2009, OSA, pp. 575-584.
Romero et al. "Theory of optimal beam splitting by phase gratings. II. Square and hexagonal gratings" J. Opt. Soc. Am. A/vol. 24 No. 8 (2007) pp. 2296-2312.
Salleo A et al., Machining of transparent materials using IR and UV nanosecond laser pulses, Appl. Physics A 71, 601-608, 2000.
Serafetinides et al., "Polymer ablation by ultra-short pulsed lasers" Proceedings of SPIE vol. 3885 (2000) http://proceedings.spiedigitallibrary.org/.
Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometric optics-based design of laser beam shapers",Opt. Eng. 42(11), 3123-3138 (2003). doi:10.1117/1.1617311.
Stoian et al. "Spatial and temporal laser pulse design for material processing on ultrafast scales" Applied Physics A (2014) 114, p. 119-127.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Thiele, "Relation between catalytic activity and size of particle" Industrial and Egineering Chemistry, vol. 31 No. 7, pp. 916-920.
Toytman et al. "Optical breakdown in transparent media with adjustable axial length and location", Optics Express vol. 18 No. 24, 24688-24698 (2010).
Vanagas et al., "Glass cutting by femtosecond pulsed irradiation"; J. Micro/Nanolith, MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Velpula et al.. "Ultrafast imaging of free carriers: controlled excitation with chirped ultrafast laser Bessel beams", Proc. Of SPIE vol. 8967 896711-1 (2014).
Wang et al, "Investigation on CO2 laser irradiation inducing glass strip peeling for microchannel formation", Biomicrofluidics 6, 012820 (2012).
Wu et al. "Optimal orientation of the cutting head for enhancing smoothness movement in three-dimensional laser cutting" (2013) Zhongguo Jiguang/Chinese Journal of Lasers, 40 (1), art. No. 0103005.
Xu et al. "Optimization of 3D laser cutting head orientation based on the minimum energy consumption" (2014) International Journal of Advanced Manufacturing Technology, 74 (9-12), pp. 1283-1291.
Yan et al. "Fiber structure to convert a Gaussian beam to higher-order optical orbital angular momentum modes" Optics Letters vol. 37 No. 16 (2012) pp. 3294-3296.
Yoshino et al., "Micromachining with a high repetition rate femtosecond fiber laser"; JLMN-Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
"What is the difference between Ra and RMS?"; Harrison Electropolishing LP; (http://www.harrisonep.com/electropolishingra.html), Accessed Aug. 8, 2016.
"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug., 2011.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
Abramov et al., "Laser separation of chemically strengthened glass"; Physics Procedia 5 (2010) 285-290, Elsevier.; doi: 10.1016/j.phpro.2010.08.054.
Ahmed et al. "Display glass cutting by femtosecond laser induced single shot periodic void array" Applied Physics A: Materials Science and Proccessing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
Bagchi et al. "Fast ion beams from intense, femtosecond laser irradiated nanostructured surfaces" Applied Physics B 88 (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) 021107.
Bhuyan et al. "Ultrafast Bessel beams for high aspect ratio taper free micromachining of glass" Proc. Of SPIE vol. 7728 77281V-1.
Bhuyan et al., "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Case Design Guidelines for Apple Devices Release R5 (https://web.archive.org/web/20131006050442/https://developer.apple.com/resources/cases/Case-Design-Guidelines.pdf ; archived on Oct. 6, 2013).
Chiao et al. 9. "Self-trapping of optical beams," Phys. Rev. Lett, vol. 13, No. 15, p. 479 (1964).
Corning Inc., "Corning® 1737 AM LCD Glass Substrates Material Information", issued Aug. 2002.
Corning Inc., "Corning® Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
Dong et al. "On-axis irradiance distribution of axicons illuminated by spherical wave", Optics & Laser Technology 39 (2007) 1258-1261.
Duocastella et al. "Bessel and annular beams for material processing", Laser Photonics Rev. 6, 607-621, 2012.
Durnin. "Exact solutions for nondiffracting beams I. The scaler theory" J. Opt. Soc. Am. A. 4(4) pp. 651-654.
Eaton et al. "Heat accumulation effects in femtosecond laser written waveguides with variable repetition rates", Opt. Exp. 5280, vol. 14, No. 23, Jun. 2006.
Gattass et al. "Micromachining of bulk glass with bursts of femtosecond laser pulses at variable repetition rates" Opt. Exp. 5280, vol. 14, No. 23, Jun. 2006.

(56) References Cited

OTHER PUBLICATIONS

Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.

Glezer et al., "Ultrafast-laser driven micro-explosions in transparent materials"; Applied Physics Letters, vol. 71 (1997), pp. 882-884.

Golub, I., "Fresnel axicon"; Optic Letters, vol. 31, No. 12, Jun. 15, 2006, Optical Society of America, pp. 1890-1892.

Gori et al. "Analytical derivation of the optimum triplicator" Optics Communications 157 (1998) pp. 13-16.

Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.

Honda et al. "A Novel Polymer Film that Controls Light Transmission", Progress in Pacific Polymer Science 3, 159-169 (1994).

http://www.gtat.com/Collateral/Documents/English-US/Sapphire/12-21-12_GT_TouchScreen_V3_web.pdf.

Hu et al. "5-axis laser cutting interference detection and correction based on STL model" (2009) Zhongguo Jiguang/Chinese Journal of Lasers, 36 (12), pp. 3313-3317.

Huang et al., "Laser etching of glass substrates by 1064 nm laser irradiation", Applied Physics, Oct. 2008, vol. 93, Issue 1, pp. 159-162.

Juodkazis S. et al. Laser induced microexplosion confined in the bulk of a sapphire crystal: evidence of multimegabar pressures., Phys. Rev. Lett. 96, 166101, 2006.

Karlsson et al. "The technology of chemical glass strengthening—a review" Glass Technol: Eur. J. Glass Sci. Technol. A (2010) 51 (2) pp. 41-54.

Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.

Kruger et al., "Femtosecond-pulse visible laser processing of transparent materials"; Applied Surface Science 96-98 (1996) 430-438.

Kruger et al., "Laser micromachining of barium aluminium borosilicate glass with pluse durations between 20 fs and 3 ps"; Applied Surface Science 127-129 (1998) 892-898.

Kruger et al., "Structuring of dielectric and metallic materials with ultrashort laser pulses between 20 fs and 3 ps"; SPIE vol. 2991, 0277-786X/97, pp. 40-47.

Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.

Levy et al. "Design, fabrication, and characterization of circular Dammann gratings based on grayscale lithography," Opt. Lett vol. 35, No. 6, p. 880-882 (2010).

Liu X et al. "laser ablation and micromachining with ultrashort laser pulses", IEEE J. Quantum Electronics, 22, 1706-1716, 1997.

Maeda et al. "Optical performance of angle-dependent light-control glass", Proc. SPIE 1536, Optical Materials Technology for Energy Efficiency and Solar Energy Conversion X, 138 (Dec. 1, 1991).

Mbise et al. "Angular selective window coatings: theory and experiments" J. Phys. D: Appl. Phys. 30 2103 (1997).

\* cited by examiner

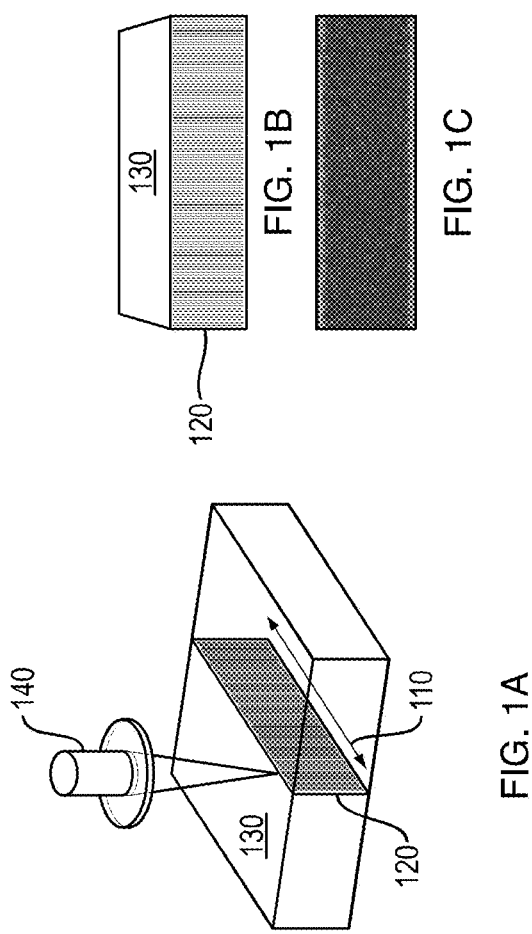

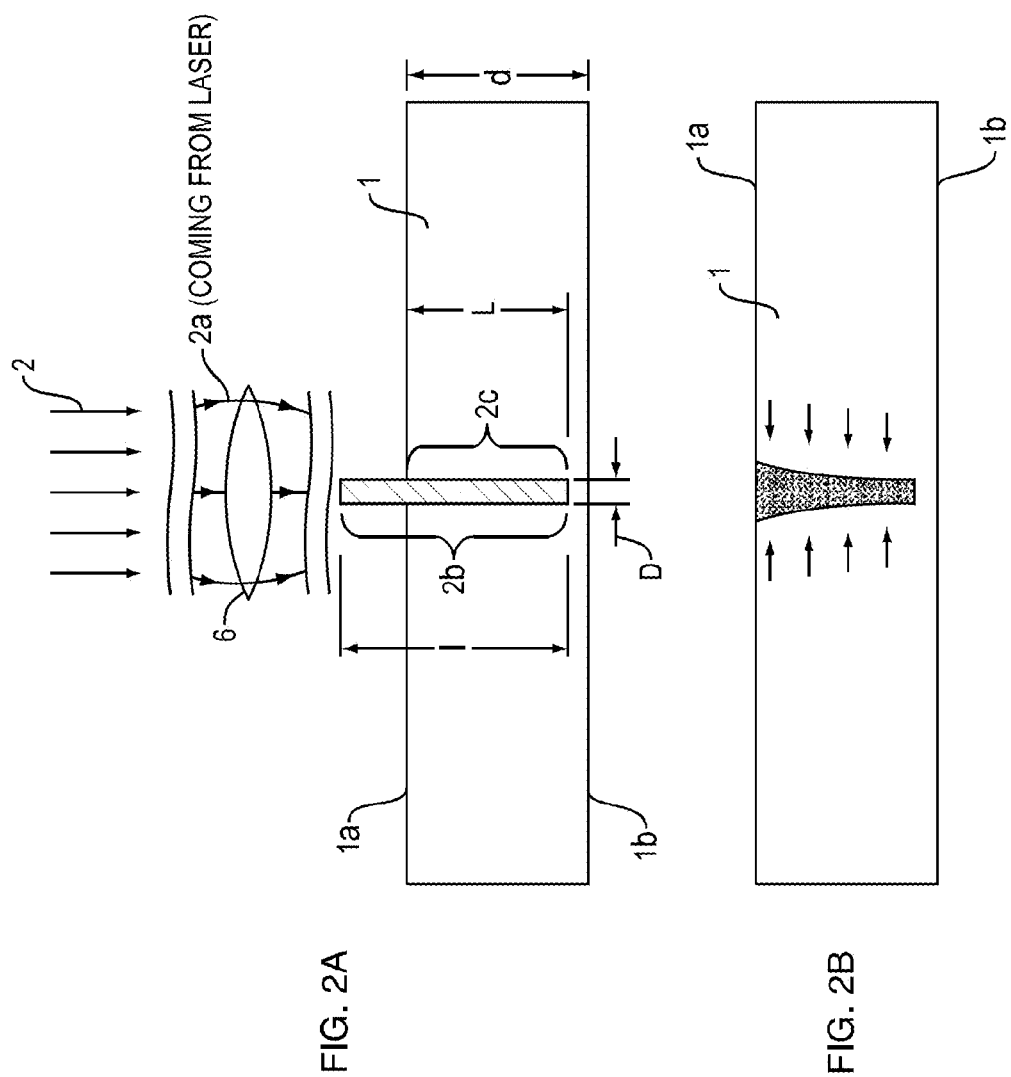

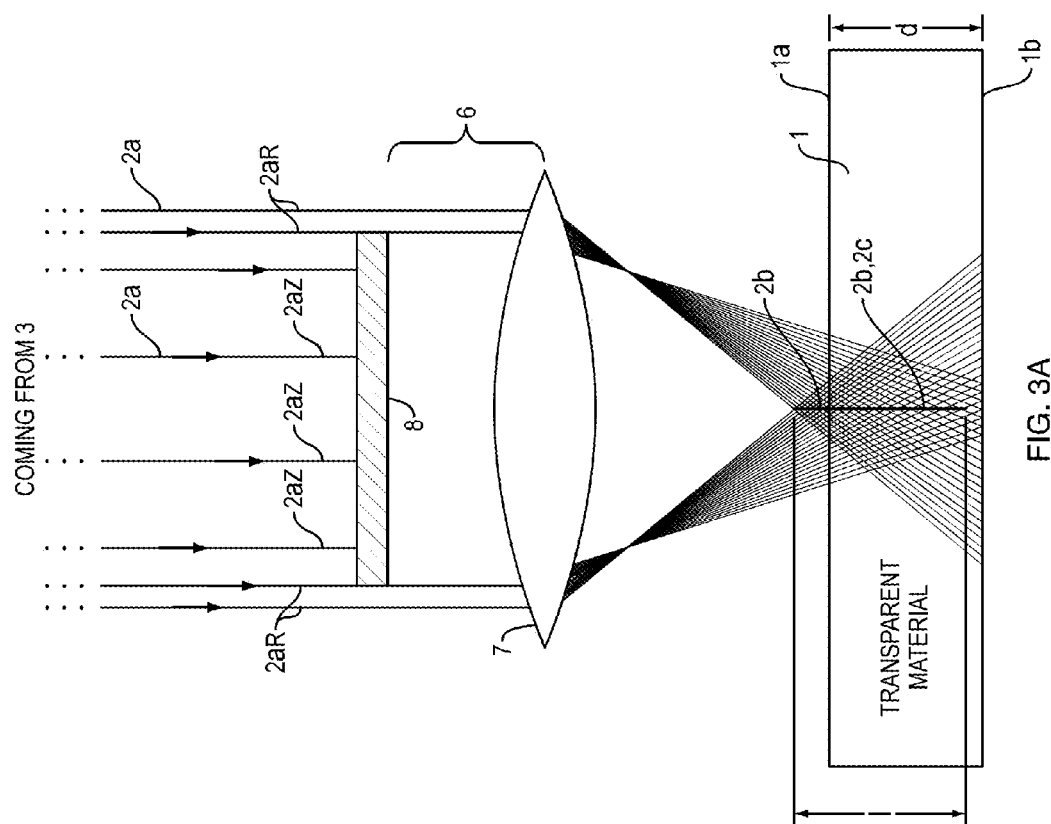

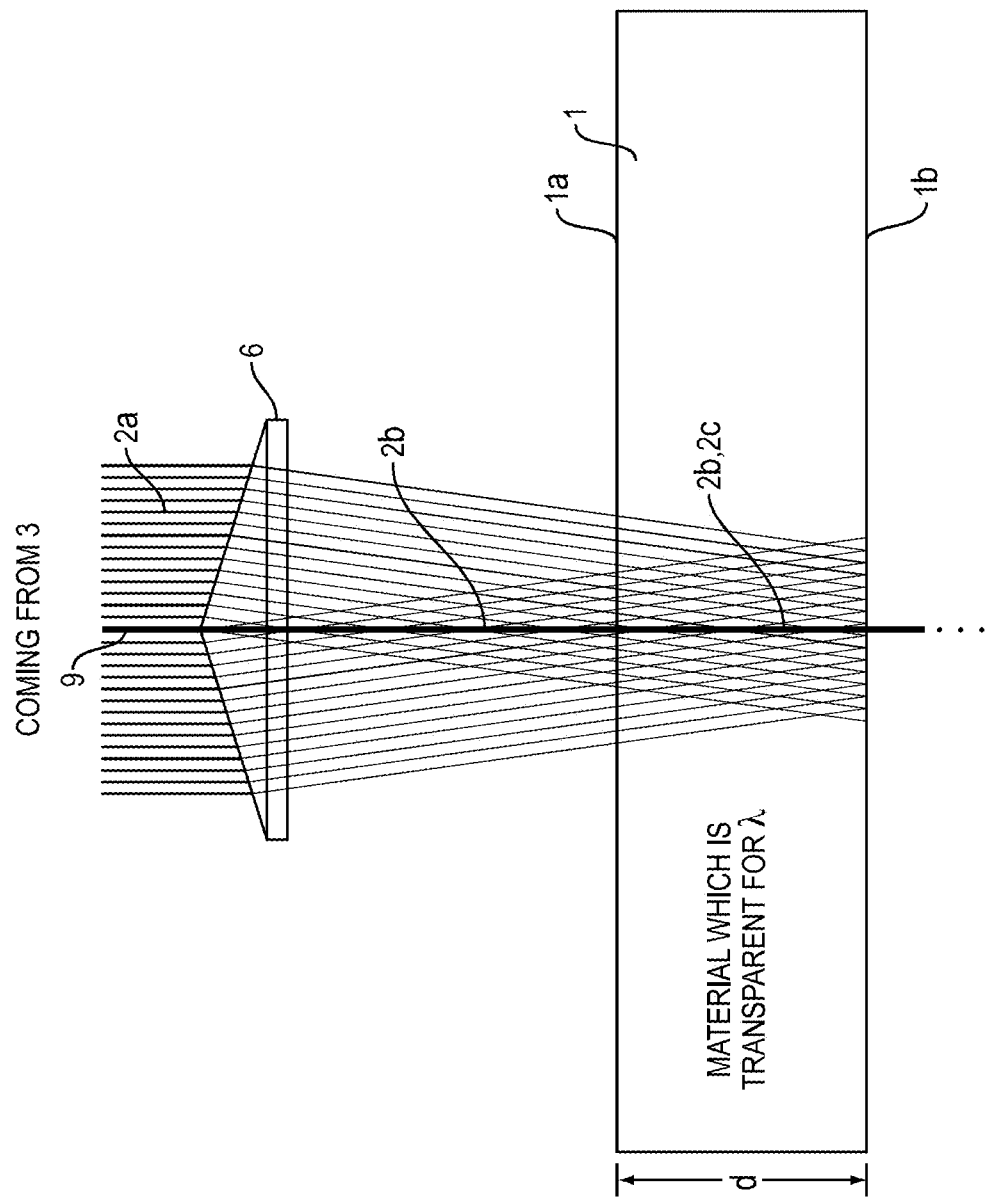

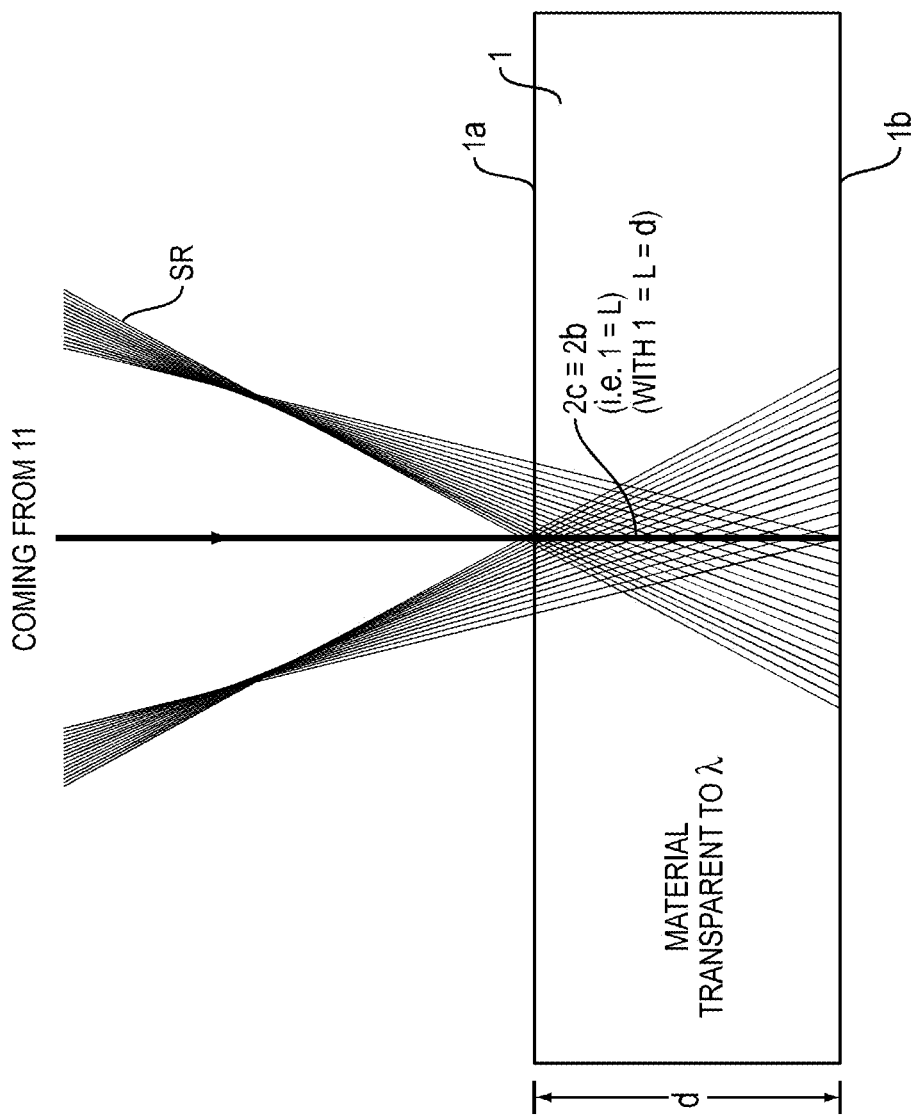

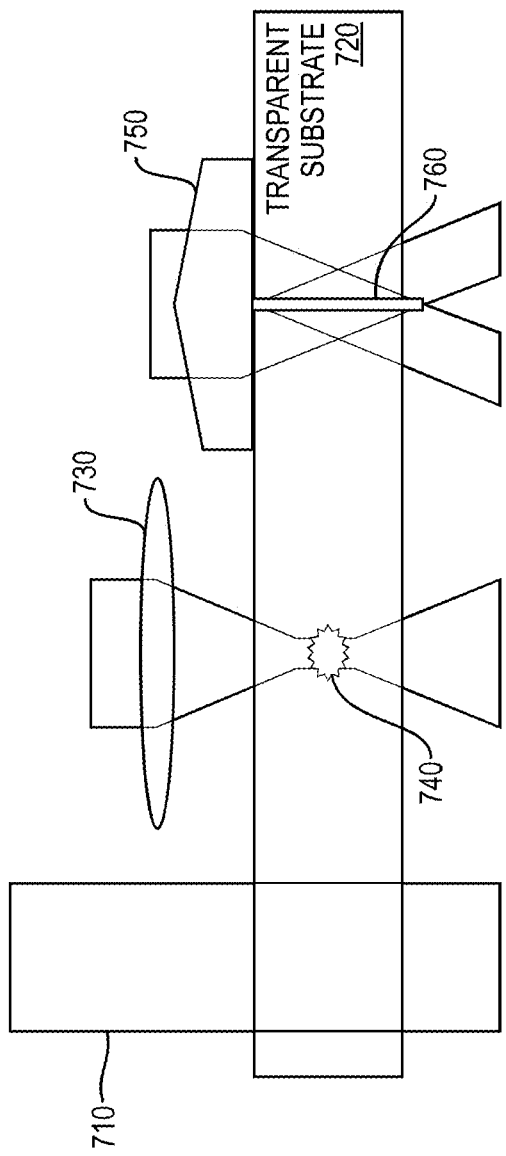

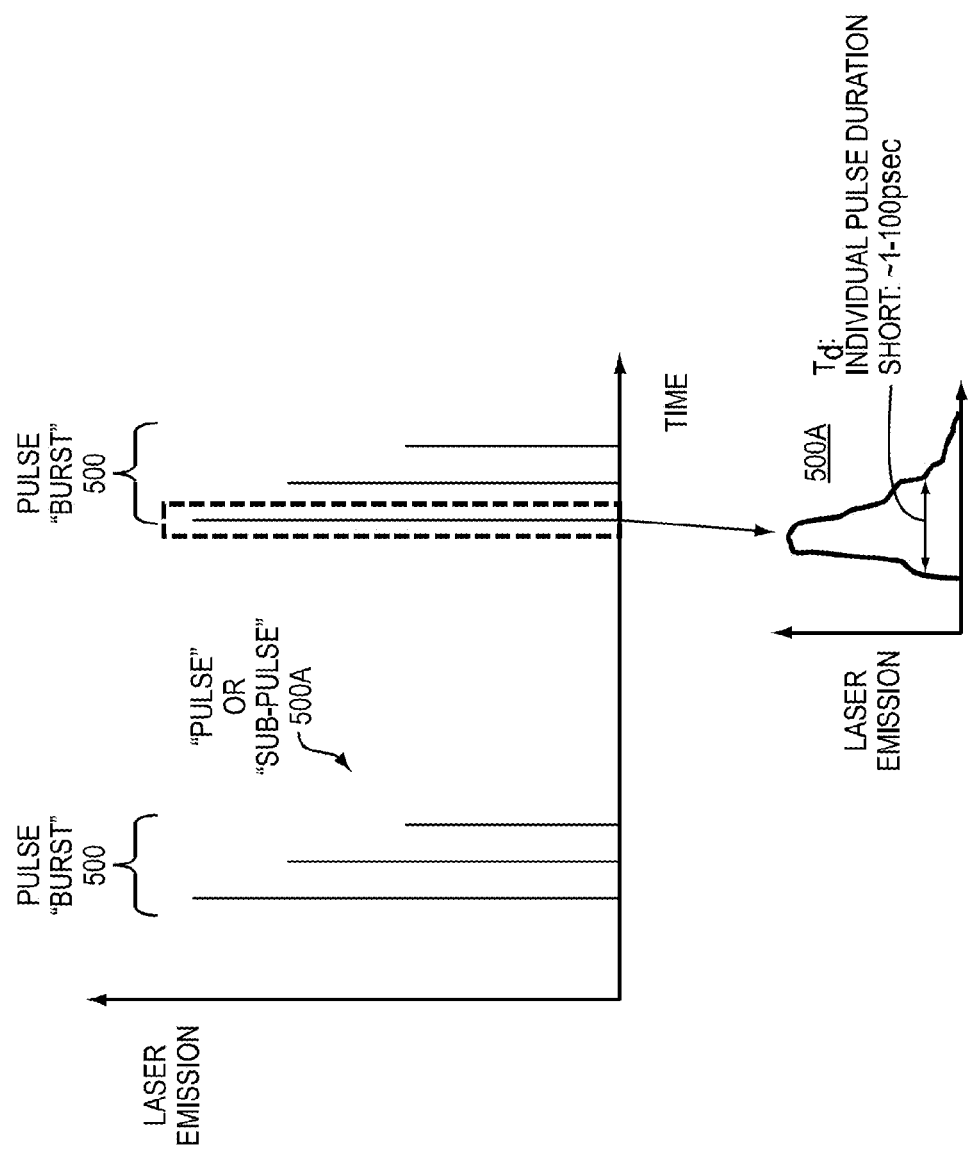

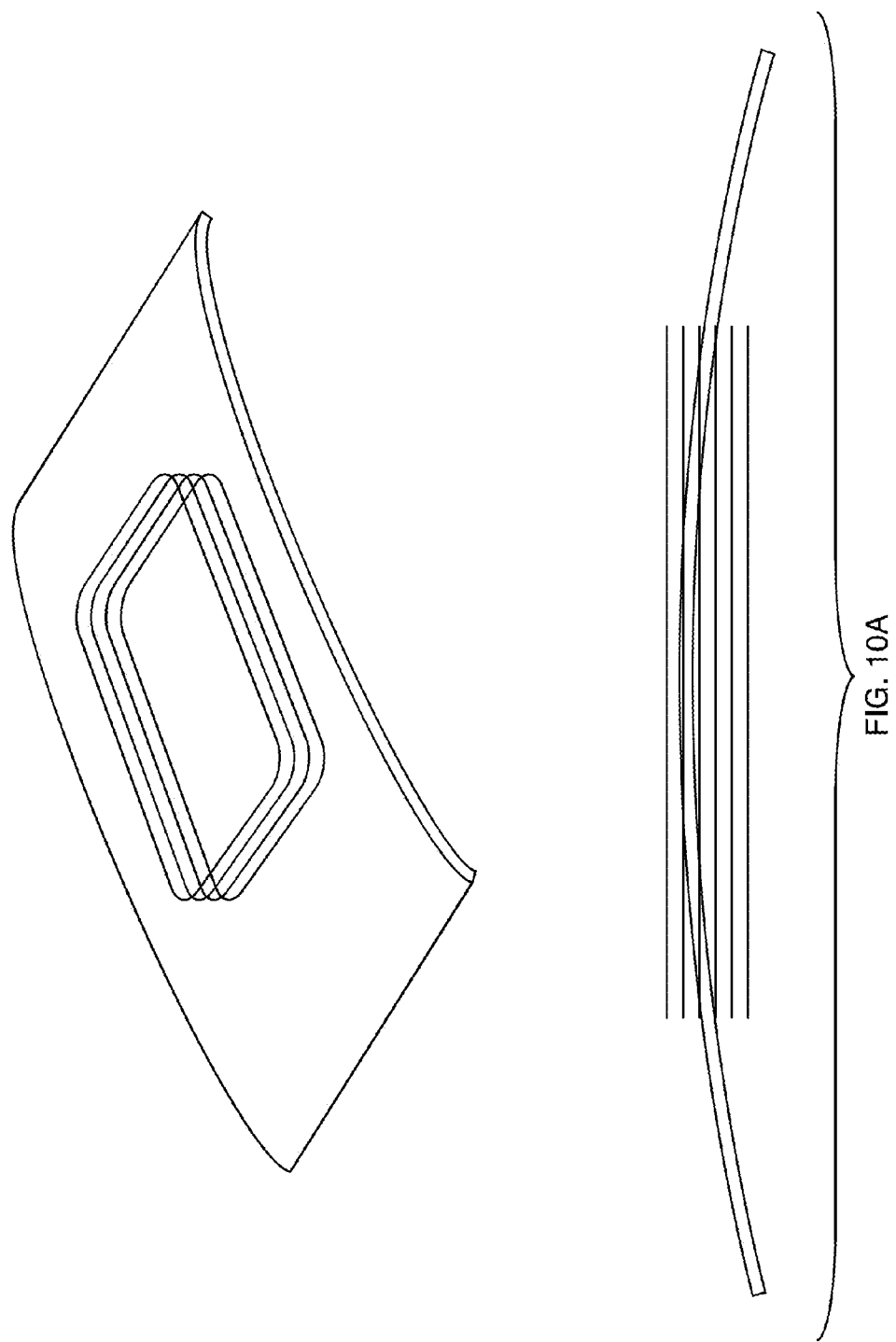

PROCESSING 3D SHAPED TRANSPARENT BRITTLE SUBSTRATE

RELATED APPLICATIONS

This application is a divisional of U.S. application Ser. No. 14/530,379 filed on Oct. 31, 2014, which claims the benefit of U.S. Provisional Application No. 61/917,127 filed on Dec. 17, 2013, U.S. Provisional Application No. 62/024,581 filed on Jul. 15, 2014, and U.S. Provisional Application No. 62/046,360 filed on Sep. 5, 2014; the entire disclosures of which are incorporated herein by reference.

BACKGROUND

The next wave of consumer electronics products is incorporating not only software and hardware innovations, but also changes that have design and functional appeal. New products are being announced and released on a regular basis with some form of three dimensional (3D) glass part incorporated in them. Some examples include curved LCD TV screens, curved smart-phones and wearable gadgets (wrist phones, watches, etc.) that are either flexible or have a curved shape. Other elements of design in these types of devices are the back covers that have gone from the traditional flat glass cover plates to three dimensional curved surfaces of different styles. These innovations bring new challenges to the manufacturing processes of these 3D parts that are made of glass, which invariably need to be scratch- and impact-resistant.

The difficulty to form the different shapes has increased significantly as most of production lines were designed to handle flat two-dimensional parts. In general, these 3D parts are hot stamped and formed into the desired shape and one of the big challenges is to release the part from the hot molded oversized part to the final and finished product. Depending on the technology deployed in the existing production lines, the first step to adapt them to processing 3D shapes is to retrofit them with the necessary capability. CNC machining, for example, may need 5-axis tool movement to enable processing more complex shapes. Likewise, other technologies, such as laser, abrasive water jet, scribing and breaking, etc., will all need to be adapted to cut, mill, drill and finish some of the features on the three dimensional piece.

Other changes that add to the complexity of transitioning from 2D to 3D processing come from the material perspective. In 3D parts, the curves, bends and turns become sources of mechanical stress accumulation, which can greatly impact processing the part after it is hot formed. For example, if the part is hot stamped from an oversized glass plate, cutting and release from the matrix will be necessary, and depending on its shape, the residual stress accumulated on the curved parts can easily induce shattering of the part upon tool contact.

There are as many different methods to cut and separate glass as there are edge shapes. Glass can be cut mechanically (CNC machining, abrasive water jet, scribing and breaking, etc.), using electro-magnetic radiation (lasers, electrical discharges, gyrotron, etc) and many other methods. The more traditional and common methods (scribe and break or CNC machining) create edges that are populated with different types and sizes of defects. It is also common to find that the edges are not perfectly perpendicular to the surfaces. In order to eliminate the defects and give the edges a more even surface with improved strength, they are usually ground. The grinding process involves abrasive removal of edge material that can give it the desired finishing and also shape its form (bull nosed, chamfered, pencil shape, etc.) In order to enable the grinding and polishing steps, it is necessary to cut parts that are larger than the final desired dimensions.

The area of laser processing of materials encompasses a wide variety of applications that involve cutting, drilling, milling, welding, melting, etc. and different types of materials. Among these applications, one that is of particular interest is cutting or separating different types of substrates. However, not all of the existing laser techniques and tools lend themselves to precision cutting and finishing. Many are too abrasive, such as ablative processes, and leave a lot of defects and micro-cracks. As discussed above, defects and micro-cracks lead to weaker edges and parts and require oversized substrates to account for grinding and polishing steps until the part is finished to the desired dimensions. As a consequence, there is a great interest to have a faster, cleaner, cheaper, more repeatable and more reliable method of 3D glass shape cutting and extraction than what is currently practiced in the market today.

SUMMARY

The present application describes a process for cutting and separating arbitrary shapes of molded 3D thin transparent brittle substrates with particular interest in strengthened or non-strengthened glass. The method allows cutting and extracting the 3D part to its final size with no required post process finishing steps. The method can be applied to 3D parts that are strengthened (for example, chemically ion-exchanged, or thermally tempered) or non-strengthened (raw glass).

The process separates parts in a controllable fashion with negligible debris, minimum defects, and low subsurface damage to the edges that preserves part strength. The present laser method is well suited for materials that are transparent to the selected laser wavelength. Demonstrations of the method have been made using 0.55 mm thick sheets of glass, e.g., molded Corning Gorilla® glass, for example glass code 2319.

In the process, an ultra-short pulsed laser is used to create a vertical defect line in the substrate material. A series of defect lines create a fault line that delineates the desired contour of the shape and establishes a path of least resistance for crack propagation and along which separation and detachment of the shape from its substrate matrix occurs. The laser separation method can be tuned and configured to enable manual separation, partial separation or total separation of the 3D shapes out of the original substrate.

In the first step, the object to be processed (substrate) is irradiated with an ultra-short pulsed laser beam that has been condensed into a high aspect ratio line focus with high energy density that penetrates through the thickness of the substrate. Within this volume of high energy density, the material is modified via nonlinear effects. The nonlinear effects provide a mechanism of transferring energy from the laser beam to the substrate to enable formation of the defect line. It is important to note that without this high optical intensity nonlinear absorption is not triggered. Below the intensity threshold for nonlinear effects, the material is transparent to the laser radiation and remains in its original state. By scanning the laser over a desired line or path, a narrow fault line (a plurality of vertical defect lines a few microns wide) defines the perimeter or shape of the part to be separated from the substrate.

In some embodiments, the pulse duration can be in a range of between greater than about 1 picoseconds and less than about 100 picoseconds, such as greater than about 5 picoseconds and less than about 20 picoseconds, and the repetition rate can be in a range of between about 1 kHz and 4 MHz, such as in a range of between about 10 kHz and 650 kHz. In addition to a single pulse at the aforementioned repetition rates, the pulses can be produced in bursts of two pulses or more (such as 3 pulses, 4, pulses, 5 pulses, 10 pulses, 15 pulses, 20 pulses, or more) separated by a duration in a range of between about 1 nsec and about 50 nsec, for example, 10 nsec to 30 nsec, such as about 20 nsec, and the burst repetition frequency can be in a range of between about 1 kHz and about 200 kHz. The pulsed laser beam can have a wavelength selected such that the material is substantially transparent at this wavelength. The average laser power measured at the material can be greater than 40 microJoules per mm thickness of material, for example between 40 microJoules/mm thickness of material and 1000 microJoules/mm thickness of material, or between 100 and 650 microJoules/mm thickness of material.

The laser beam focal line can have a length in a range of between about 0.1 mm and about 10 mm, such as about 1 mm, about 2 mm, about 3 mm, about 4 mm, about 5 mm, about 6 mm, about 7 mm, about 8 mm, or about 9 mm, or a length in a range of between about 0.1 mm and about 1 mm, and an average spot diameter in a range of between about 0.1 micron and about 5 microns. The holes or defect lines each can have a diameter between 0.1 microns and 100 microns, for example, 0.25 to 5 microns.

Once the fault line with vertical defects is created, separation can occur via: 1) manual or mechanical stress on or around the fault line; the stress or pressure should create tension that pulls both sides of the fault line apart and breaks the areas that are still bonded together; 2) using a heat source, to create a stress zone around the fault line to put the vertical defect lines in tension and induce partial or total self-separation. In both cases, separation depends on process parameters such as laser scan speed, laser power, parameters of lenses, pulse width, repetition rate, etc.

The present disclosure extends to:

A method of laser processing a glass workpiece having a 3D surface, the method comprising:
focusing a pulsed laser beam into a laser beam focal line oriented along the beam propagation direction and directed toward a contour defining a part to be separated from the workpiece;
in one or more passes:
translating the workpiece and the laser beam relative to each other along the contour, the laser beam focal line generating an induced absorption within the workpiece at locations along the contour where the laser beam focal line extends into the workpiece, and the induced absorption producing a defect line along the laser beam focal line within the workpiece at each location; and
translating the workpiece and the laser beam relative to each other;
the one or more passes selected such that the defect lines produced along the contour of the part in the workpiece are of sufficient number and depth to facilitate separation of the part from the workpiece.

The present disclosure extends to:

A method of laser processing a flat non-strengthened glass workpiece, the method comprising:
focusing a pulsed laser beam into a laser beam focal line oriented along the beam propagation direction and directed into the workpiece along the contour, the laser beam focal line generating an induced absorption within the workpiece, the induced absorption producing a defect line along the laser beam focal line within the workpiece;
translating the workpiece and the laser beam relative to each other along a contour, thereby laser forming a plurality of defect lines along the contour within the workpiece, the contour defining a part to be separated from the workpiece; and
molding the workpiece containing the defined part to have a 3D surface.

The present disclosure extends to:

A method of laser processing a molded non-strengthened glass workpiece, the method comprising:
vacuum flattening the molded glass workpiece;
focusing a pulsed laser beam into a laser beam focal line oriented along the beam propagation direction and directed into the vacuum flattened workpiece along a contour, the laser beam focal line generating an induced absorption within the workpiece, the induced absorption producing a defect line along the laser beam focal line within the workpiece;
translating the vacuum flattened workpiece and the laser beam relative to each other along the contour, thereby laser forming a plurality of defect lines along the contour within the workpiece the contour defining a part to be separated from the workpiece; and
releasing vacuum on the vacuum flattened workpiece containing the defined part.

The present disclosure extends to:

A glass article having a 3D surface, the glass article having at least one edge having a plurality of defect lines extending at least 250 microns, the defect lines each having a diameter less than or equal to about 5 microns.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon the illustrated embodiments.

FIGS. 1A-1C are illustrations of a fault line with equally spaced defect lines of modified glass. FIG. 1A is an illustration of a laser creating a fault line through the sample. FIG. 1B is an illustration of an edge with defect lines after separation. FIG. 1C is a photograph of a separated edge.

FIGS. 2A and 2B are illustrations of positioning of the laser beam focal line, i.e., the processing of a material transparent for the laser wavelength due to the induced absorption along the focal line.

FIG. 3A is an illustration of an optical assembly for laser processing according to one embodiment.

FIG. 4 is an illustration of a second embodiment of an optical assembly for laser processing.

FIGS. 5A and 5B are illustrations of a third embodiment of an optical assembly for laser processing.

FIGS. 7A-7C illustrate different laser intensity regimes for laser processing of materials. FIG. 7A illustrates an unfocused laser beam, FIG. 7B illustrates a condensed laser beam with a spherical lens, and FIG. 7C illustrates a condensed laser beam with an axicon or diffractive Fresnel lens.

FIGS. 8A-B depicts laser emission as a function of time for a picosecond laser. Each emission is characterized by a pulse "burst" which may contain one or more sub-pulses. Times corresponding to pulse duration, separation between pulses, and separation between bursts are illustrated

FIG. 10A illustrates a process to generate defect lines following a traced path. At each relative position between the 3D glass surface and the line-focus, the rectangular shape with rounded corners is traced all around. Then the relative position is stepped down by 200 microns and the same shape is traced again. The process is repeated until the defect lines are completely defined in the curved glass panel.

DETAILED DESCRIPTION OF THE DISCLOSURE

Figures 3, 3B:
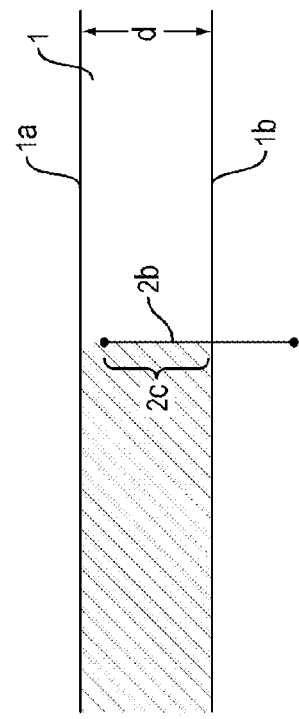
FIG. 3B-1-3B-4 is an illustration of various possibilities to process the substrate by differently positioning the laser beam focal line relative to the substrate.

A description of example embodiments follows.

The present application provides processes for precision cutting and separation of arbitrary shapes of molded 3D thin transparent brittle substrates, with particular interest in strengthened or non-strengthened glasses. In one embodiment, the glass is Gorilla® glass (all codes, available from Corning, Inc.). Embodiment methods allow cutting and extracting one or more 3D parts, or parts with a 3D surface, to their final size with no required post-process finishing steps. The method can be applied to 3D parts that are strengthened (for example, chemically ion-exchanged) or unstrengthened (raw glass).

Cutting of a transparent material with a laser in accordance with the present disclosure may also be referred to herein as drilling or laser drilling or laser processing.

The processes permit parts to be separated in a controllable fashion with negligible debris, minimum defects, and low subsurface damage to the edges, preserving strength of the part or workpiece. The workpiece is the material or object subjected to the laser methods disclosed herein and may also be referred to herein as a material, a substrate or substrate material. One or more parts or articles can be separated from the workpieces. The parts or articles can include, for example, a glass cover for a phone that has a curved surface or automotive glass.

The present laser methods are well suited for materials that are transparent or substantially transparent to the selected laser wavelength in the linear intensity regime. Within the context of the present disclosure, a material or article is substantially transparent to the laser wavelength when the absorption of the material at the laser wavelength is less than about 10% per mm of material depth, or less than about 5% per mm of material depth, or less than about 2% per mm of material depth, or less than about 1% per mm of material depth. The present laser methods can take advantage of transparency of the substrate material to the laser wavelength in the linear regime of power (low laser intensity (energy density)). Transparency in the linear intensity regime reduces or prevents damage to the surface of the substrate as well as subsurface damage away from the region of high intensity defined by the focused laser beam.

As used herein, subsurface damage refers to the maximum size (e.g. length, width, diameter) of structural imperfections in the perimeter surface of the part separated from the substrate or material subjected to laser processing in accordance with the present disclosure. Since the structural imperfections extend from the perimeter surface, subsurface damage may also be regarded as the maximum depth from the perimeter surface in which damage from laser processing in accordance with the present disclosure occurs. The perimeter surface of the separated part may be referred to herein as the edge or the edge surface of the separated part. The structural imperfections may be cracks or voids and represent points of mechanical weakness that promote fracture or failure of the part separated from the substrate or material. By minimizing the size of subsurface damage, the present method improves the structural integrity and mechanical strength of separated parts.

In accordance with methods described below, in a single pass, a laser can be used to create highly controlled full or partial perforations through the material, with extremely little (<75 µm, often <50 µm) subsurface damage and debris generation. Sub-surface damage may be limited to the order of 100 µm in depth or less, or 75 µm in depth or less, or 60 µm in depth or less, or 50 µm in depth or less, and the cuts may produce only low debris. This is in contrast to the typical use of spot-focused laser to ablate material, where multiple passes are often necessary to completely perforate the glass thickness, large amounts of debris are formed from the ablation process, and more extensive sub-surface damage (>100 µm) and edge chipping occur.

Thus, with the present methods, it is possible to create microscopic (i.e., <2 µm and >100 nm in diameter, and in some embodiments <0.5 µm and >100 nm in diameter) elongated defect lines (also referred to herein as perforations, holes, or damage tracks) in transparent materials using one or more high energy pulses or one or more bursts of high energy pulses. The perforations represent regions of the substrate material modified by the laser. The laser-induced modifications disrupt the structure of the substrate material and constitute sites of mechanical weakness. Structural disruptions include compaction, melting, dislodging of material, rearrangements, and bond scission. The perforations extend into the interior of the substrate material and have a cross-sectional shape consistent with the cross-sectional shape of the laser (generally circular). The average diameter of the perforations may be in the range from 0.1 µm to 50 µm, or in the range from 1 µm to 20 µm, or in the range from 2 µm to 10 µm, or in the range from 0.1 µm to 5 µm. In some embodiments, the perforation is a "through hole", which is a hole or an open channel that extends from the top to the bottom of the substrate material. In some embodiments, the perforation may not be a continuously open channel and may include sections of solid material dislodged from the substrate material by the laser. The dislodged material blocks or partially blocks the space defined by the perforation. One or more open channels (unblocked regions) may be dispersed between sections of dislodged material. The diameter of the open channels is may be <1000 nm, or <500 nm, or <400 nm, or <300 nm or in the range from 10 nm to 750 nm, or in the range from 100 nm to 500 nm. The disrupted or modified area (e.g., compacted, melted, or otherwise changed) of the material surrounding the holes in the embodiments disclosed herein, preferably has diameter of <50 µm (e.g., <10 µm).

The individual perforations can be created at rates of several hundred kilohertz (several hundred thousand perforations per second, for example). Thus, with relative motion between the laser source and the material these perforations can be placed adjacent to one another with spatial separations varying from sub-micron to several or even tens of microns as desired. Distance between adjacent defect lines along the direction of the fault lines can, for example, be in range from 0.25 µm to 50 µm, or in the range from 0.50 µm to about 20 µm, or in the range from 0.50 µm to about 15 µm, or in the range from 0.50 µm to 10 µm, or in the range from 0.50 µm to 3.0 µm or in the range from 3.0 µm to 10 µm. The spatial separation is selected in order to facilitate cutting.

In addition to transparency of the substrate material in the linear intensity regime, selection of the laser source is further predicated on the ability to induce multi-photon absorption (MPA) in the transparent material. MPA is the simultaneous absorption of multiple photons of identical or different frequencies in order to excite a material from a lower energy state (usually the ground state) to a higher energy state (excited state). The excited state may be an excited electronic state or an ionized state. The energy difference between the higher and lower energy states of the material is equal to the sum of the energies of the two or more photons. MPA is a nonlinear process that is generally several orders of magnitude weaker than linear absorption. It differs from linear absorption in that the strength of MPA depends on the square or higher power of the light intensity, thus making it a nonlinear optical process. At ordinary light intensities, MPA is negligible. If the light intensity (energy density) is extremely high, such as in the region of focus of a laser source (particularly a pulsed laser source), MPA becomes appreciable and leads to measurable effects in the material within the region where the energy density of the light source is sufficiently high. Within the focal region, the energy density may be sufficiently high to result in ionization.

At the atomic level, the ionization of individual atoms has discrete energy requirements. Several elements commonly used in glass (e.g., Si, Na, K) have relatively low ionization energies (~5 eV). Without the phenomenon of MPA, a wavelength of about 248 nm would be required to create linear ionization at ~5 eV. With MPA, ionization or excitation between states separated in energy by ~5 eV can be accomplished with wavelengths longer than 248 nm. For example, photons with a wavelength of 532 nm have an energy of ~2.33 eV, so two photons with wavelength 532 nm can induce a transition between states separated in energy by ~4.66 eV in two-photon absorption (TPA), for example. Thus, atoms and bonds can be selectively excited or ionized in the regions of a material where the energy density of the laser beam is sufficiently high to induce nonlinear TPA of a laser wavelength having half the required excitation energy, for example.

MPA can result in a local reconfiguration and separation of the excited atoms or bonds from adjacent atoms or bonds. The resulting modification in the bonding or configuration can result in non-thermal ablation and removal of matter from the region of the material in which MPA occurs. This removal of matter creates a structural defect (the defect line, damage line, or perforation referred to hereinabove) that mechanically weakens the material and renders it more susceptible to cracking or fracturing upon application of mechanical or thermal stress. By controlling the placement of perforations, a contour or path along which cracking occurs can be precisely defined and precise micromachining of the material can be accomplished. The contour defined by a series of perforations may be regarded as a fault line and corresponds to a region of structural weakness in the material. The fault line defines the preferred contour for separation of a part from the material and controls the shape of the separated part. In one embodiment, micromachining includes separation of a part from the material processed by the laser, where the part has a precisely defined shape or perimeter determined by a fault line defining a closed contour of perforations formed through MPA effects induced by the laser. As used herein, the term closed contour refers to a perforation path formed by the laser line, where the path intersects with itself at some location. An internal contour is a path formed where the resulting shape is entirely surrounded by an outer portion of material.

The preferred laser is an ultrashort pulsed laser (pulse durations on the order of 100 picoseconds or shorter) and can be operated in pulse mode or burst mode. In pulse mode, a series of nominally identical single pulses is emitted from the laser and directed to the workpiece. In pulse mode, the repetition rate of the laser is determined by the spacing in time between the pulses. In burst mode, bursts of pulses are emitted from the laser, where each burst includes two or more pulses (of equal or different amplitude). In burst mode, pulses within a burst are separated by a first time interval (which defines a pulse repetition rate for the burst) and the bursts are separated by a second time interval (which defines a burst repetition rate), where the second time interval is typically much longer than the first time interval. As used herein (whether in the context of pulse mode or burst mode), time interval refers to the time difference between corresponding parts of a pulse or burst (e.g. leading edge-to-leading edge, peak-to-peak, or trailing edge-to-trailing edge). Pulse and burst repetition rates are controlled by the design of the laser and can typically be adjusted, within limits, by adjusting operating conditions of the laser. Typical pulse and burst repetition rates are in the kHz to MHz range.

The laser pulse duration (in pulse mode or for pulses within a burst in burst mode) may be $10^{-10}$ s or less, or $10^{-11}$ s or less, or $10^{-12}$ s or less, or $10^{-13}$ s or less. In the exemplary embodiments described herein, the laser pulse duration is greater than $10^{-15}$.

One feature of embodiment processes is the high aspect ratio of defect lines created by an ultra-short pulsed laser. The high aspect ratio allows creation of a defect line that extends from the top surface to the bottom surface of the substrate material. The present methods also permit formation of defect lines that extend to a controlled depth within the substrate material. The defect line can be created by a single pulse or single burst of pulses, and, if desired, additional pulses or bursts can be used to increase the extension of the affected area (e.g., depth and width).

The generation of a line focus may be performed by sending a Gaussian laser beam into an axicon lens, in which case a beam profile known as a Gauss-Bessel beam is created. Such a beam diffracts much more slowly (e.g. may maintain single micron spot sizes for ranges of hundreds of microns or millimeters as opposed to few tens of microns or less) than a Gaussian beam. Hence the depth of focus or length of intense interaction with the material may be much larger than when using a Gaussian beam only. Other forms or slowly diffracting or non-diffracting beams may also be used, such as Airy beams.

As illustrated in FIGS. 1A-1C, methods to cut thin glass plates 110 is based on creating a fault line or contour 110 formed of a plurality of vertical defect lines 120 in the substrate material 130 with an ultra-short pulsed laser beam 140. Depending on the material properties (absorption, coefficient of thermal expansion (CTE), stress, composition, etc.) and laser parameters chosen for processing the material 130, the creation of a fault line 110 alone can be enough to induce self-separation. In this case, no secondary separation processes, such as tension/bending forces, heating or $CO_2$ laser, are necessary.

FIG. 1B illustrates an edge of a workpiece after separating the workpiece along the contour or fault line 110 defined by the multiple vertical defect lines 120. The induced absorption creating the defect lines can produce particles on the separated edge or surface with an average diameter of less than 3 microns, resulting in a very clean cutting process. FIG. 1C is a picture showing an edge of a part separated using the laser process illustrated in FIG. 1A and further described hereinafter.

In some cases, the created fault line is not enough to separate the part from the substrate material spontaneously, and a secondary step may be necessary. If desired, a second laser can be used to create thermal stress to separate it, for example. In the case of 0.55 mm thick Gorilla® 2319, separation can be achieved after the creation of a defect line, for example, by application of mechanical force or by using a thermal source (e.g., an infrared laser, for example a $CO_2$ laser) to create thermal stress and force separation of the part from the substrate material along the fault line. Another option is to use an infrared laser to initiate the separation, and then finish the separation manually. The optional infrared laser separation can be achieved with a focused continuous wave (cw) laser emitting at 10.6 microns and with power adjusted by controlling its duty cycle. Focus change (i.e., extent of defocusing up to and including focused spot size) is used to vary the induced thermal stress by varying the spot size. Defocused laser beams include those laser beams that produce a spot size larger than a minimum, diffraction-limited spot size on the order of the size of the laser wavelength. For example, defocused spot sizes ($1/e^2$ diameter) of 2 mm to 20 mm, or 2 mm to 12 mm, or about 7 mm, or about 2 mm and or about 20 mm can be used for $CO_2$ lasers, for example, whose diffraction-limited spot size is much smaller given the emission wavelength of 10.6 microns.

There are several methods to create the defect line. The optical method of forming the focal line or line focus can take multiple forms, using donut shaped laser beams and spherical lenses, axicon lenses, diffractive elements, or other methods to form the linear region of high intensity. The type of laser (picosecond, femtosecond, etc.) and wavelength (IR, green, UV, etc.) can also be varied, as long as sufficient optical intensities are reached to create breakdown of the substrate or workpiece material in the region of focus to create breakdown of the substrate material through nonlinear optical effects (e.g., nonlinear absorption, multi-photon absorption).

In the present application, an ultra-short pulsed laser is used to create a high aspect ratio vertical defect line in a consistent, controllable and repeatable manner. The details of the optical setup that enables the creation of this vertical defect line are described below and in U.S. application Ser. No. 14/154,525 filed on Jan. 14, 2014, the entire contents of which are incorporated by reference as if fully set forth herein. The essence of this concept is to use an axicon lens element in an optical lens assembly to create a region of high aspect ratio taper-free microchannels using ultra-short (picoseconds or femtosecond duration) Bessel beams. In other words, the axicon condenses the laser beam into a high intensity region of cylindrical shape and high aspect ratio (long length and small diameter) in the substrate material. Due to the high intensity created with the condensed laser beam, nonlinear interaction of the electromagnetic field of the laser and the substrate material occurs and the laser energy is transferred to the substrate to effect formation of defects that become constituents of the fault line. However, it is important to realize that in the areas of the substrate where the laser energy intensity is not high (e.g., substrate surface, volume of substrate surrounding the central convergence line), the substrate is transparent to the laser and there is no mechanism for transferring energy from the laser to the substrate. As a result, nothing happens to the substrate when the laser intensity is below the nonlinear threshold.

Turning to FIGS. 2A and 2B, a method of laser processing a material includes focusing a pulsed laser beam 2 into a laser beam focal line 2b, viewed along the beam propagation direction. Laser beam focal line 2b can be created by several ways, for example, Bessel beams, Airy beams, Weber beams and Mathieu beams (i.e., non-diffractive beams), whose field profiles are typically given by special functions that decay more slowly in the transverse direction (i.e. direction of propagation) than the Gaussian function. As shown in FIG. 3A, laser 3 (not shown) emits laser beam 2, which has a portion 2a incident to optical assembly 6. The optical assembly 6 turns the incident laser beam into laser beam focal line 2b on the output side over a defined expansion range along the beam direction (length 1 of the focal line). The planar substrate 1 (material to be processed) is positioned in the beam path to at least partially overlap the laser beam focal line 2b of laser beam 2. Reference 1a designates the surface of the planar substrate facing the optical assembly 6 or the laser, respectively, and reference 1b designates the reverse (remote) surface of substrate 1. The substrate thickness (measured perpendicularly to the planes 1a and 1b, i.e., to the substrate plane) is labeled with d.

As FIG. 2A depicts, substrate 1 is aligned substantially perpendicularly to the longitudinal beam axis and thus behind the same focal line 2b produced by the optical assembly 6 (the substrate is perpendicular to the plane of the drawing) Viewed along the beam direction, the substrate is positioned relative to the focal line 2b in such a way that the focal line 2b starts before the surface 1a of the substrate and stops before the surface 1b of the substrate, i.e. focal line 2b terminates within the substrate and does not extend beyond surface 1b. In the overlapping area of the laser beam focal line 2b with substrate 1, i.e. in the substrate material covered by focal line 2b, the laser beam focal line 2b generates (assuming suitable laser intensity along the laser beam focal line 2b, which intensity is ensured by the focusing of laser beam 2 on a section of length l (i.e. a line focus of length l)), which defines a section 2c (aligned along the longitudinal beam direction) along which an induced nonlinear absorption is generated in the substrate material. The induced absorption induces defect line formation in the substrate material along section 2c. The formation of defect lines is not only local, but extends over the entire length of the section 2c of the induced absorption. The length of section 2c (which corresponds to the length of the overlapping of laser beam focal line 2b with substrate 1) is labeled with reference L. The average diameter or the average dimension (extent (e.g. length or other relevant linear dimension)) of the section of the induced absorption 2c (or the sections in the material of substrate 1 undergoing formation of defect lines) is labeled with reference D. The average dimension D basically corresponds to the average diameter δ of the laser beam focal line 2b, that is, an average spot diameter in a range of between about 0.1 microns and about 5 microns.

As FIG. 2A shows, the substrate material (which is transparent to the wavelength λ of laser beam 2) is locally heated due to the induced absorption along the focal line 2b. This wavelength may be, for example, 1064, 532, 355 or 266 nanometers. The induced absorption arises from the nonlinear effects (e.g. two-photon absorption, multi-photon absorption) associated with the high intensity of the laser beam within focal line 2b. FIG. 2B illustrates that the heated substrate material will eventually expand so that a correspondingly induced tension leads to micro-cracking and defect line formation, with the tension being the highest at surface 1a.

Representative optical assemblies 6, which can be applied to generate the focal line 2b, as well as a representative optical setup, in which these optical assemblies can be applied, are described below. All assemblies or setups are based on the description above so that identical references are used for identical components or features or those which are equal in their function. Therefore only the differences are described below.

To ensure high quality (regarding breaking strength, geometric precision, roughness and avoidance of re-machining requirements) of the surface of the separated part along which separation occurs, the individual focal lines positioned on the substrate surface along the line of separation or detachment (fault line) should be generated using the optical assembly described below (hereinafter, the optical assembly is alternatively also referred to as laser optics). The roughness of the separated surface (or cut edge) is determined primarily from the spot size or the spot diameter of the focal line. Roughness of a surface can be characterized, for example, by an Ra surface roughness parameter defined by the ASME B46.1 standard. As described in ASME B46.1, Ra is the arithmetic average of the absolute values of the surface profile height deviations from the mean line, recorded within the evaluation length. In alternative terms, Ra is the average of a set of absolute height deviations of individual features (peaks and valleys) of the surface relative to the mean.

In order to achieve a small spot size of, for example, 0.5 microns to 2 microns for a given wavelength λ, of the laser 3 that interacts with the material of substrate 1, certain requirements must usually be imposed on the numerical aperture of laser optics 6. These requirements are met by laser optics 6 described below. In order to achieve the required numerical aperture, the optics must, on the one hand, dispose of the required opening for a given focal length, according to the known Abbe formulae (N.A.=n sin (theta), n: refractive index of the material or workpiece to be processed, theta: half the aperture angle; and theta=arctan ($D_L$/2f); $D_L$: aperture diameter, f: focal length). On the other hand, the laser beam must illuminate the optics up to the required aperture, which is typically achieved by means of beam widening using widening telescopes between the laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only vary slightly.

According to FIG. 3A (section perpendicular to the substrate plane at the level of the central beam in the laser beam bundle of laser radiation 2; here, too, laser beam 2 is perpendicularly incident to the substrate plane (before entering optical assembly 6), i.e. incidence angle θ is 0° so that the focal line 2b or the section of the induced absorption 2c is parallel to the substrate normal), the laser radiation 2a emitted by laser 3 is first directed onto a circular aperture 8 which is completely opaque to the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely absorbed by it. Only the beams in the outer perimeter range of beam bundle 2a (marginal rays, here labeled with 2aR) are not absorbed due to the reduced aperture size compared to the beam diameter, but pass aperture 8 laterally and hit the marginal areas of the focusing optic elements of the optical assembly 6, which, in this embodiment, is designed as a spherically cut, bi-convex lens 7.

As illustrated in FIG. 3A, the laser beam focal line 2b is not only a single focal point for the laser beam, but rather a series of focal points for different rays in the laser beam. The series of focal points form an elongated focal line of a defined length, shown in FIG. 3A as the length l of the laser beam focal line 2b. Lens 7 is centered on the central beam and is designed as a non-corrected, bi-convex focusing lens in the form of a common, spherically cut lens. The spherical aberration of such a lens may be advantageous. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (defined by the distance required for the intensity of the beam to decrease to $1/e^2$ of the peak intensity) and approximately 75% of the diameter of the lens 7 of the optical assembly 6. The focal line 2b of a non-aberration-corrected spherical lens 7 generated by blocking out the beam bundles in the center is thus used. FIG. 3A shows the section in one plane through the central beam, and the complete three-dimensional bundle can be seen when the depicted beams are rotated around the focal line 2b.

One potential disadvantage of the type of a focal line formed by lens 7 and the system shown in FIG. 3A is that the conditions (spot size, laser intensity) may vary along the focal line (and thus along the desired depth in the material) and therefore the desired type of interaction (no melting, induced absorption, thermal-plastic deformation up to crack formation) may possibly occur only in selected portions of the focal line. This means, in turn, that possibly only a part of the incident laser light is absorbed by the substrate material in the desired way. In this way, the efficiency of the process (required average laser power for the desired separation speed) may be impaired, and the laser light may also be transmitted into undesired regions (e.g. parts or layers adherent to the substrate or the substrate holding fixture) and interact with them in an undesirable way (e.g., heating, diffusion, absorption, unwanted modification).

Figures 3, 3B, 4:
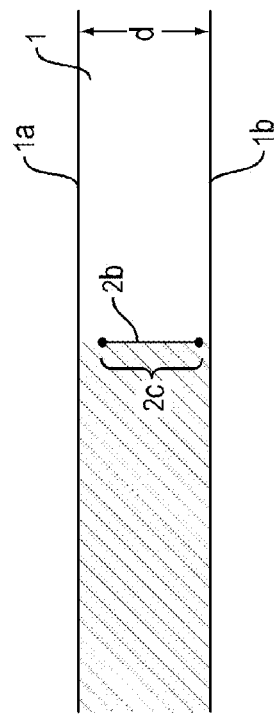
Figures 1, 3B:
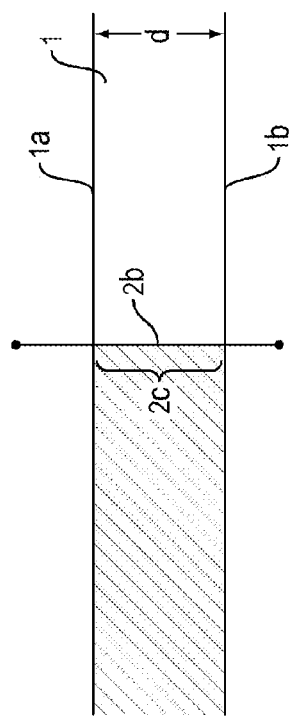

FIG. 3B-1-4 show (not only for the optical assembly in FIG. 3A, but also for any other applicable optical assembly 6) that the position of laser beam focal line 2b can be controlled by suitably positioning and/or aligning the optical assembly 6 relative to substrate 1 as well as by suitably selecting the parameters of the optical assembly 6. As FIG. 3B-1 illustrates, the length 1 of the focal line 2b can be adjusted in such a way that it exceeds the substrate thickness d (here by factor 2). If substrate 1 is placed (viewed in longitudinal beam direction) centrally to focal line 2b, the section of induced absorption 2c is generated over the entire substrate thickness. The laser beam focal line 2b can have a length 1 in a range of between about 0.01 mm and about 100 mm, in a range of between about 0.1 mm and about 10 mm, or in a range of between about 0.1 mm and 1 mm, for example. Various embodiments can be configured to have length 1 of about 0.1 mm, 0.2 mm, 0.3 mm, 0.4 mm, 0.5 mm, 0.7 mm, 1 mm, 2 mm, 3 mm or 5 mm, for example.

Figures 2, 3B:
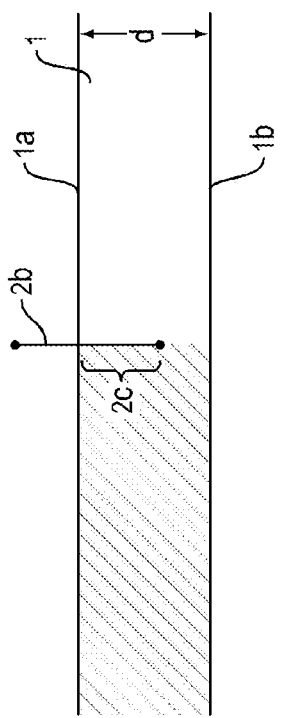

In the case shown in FIG. 3B-2, a focal line 2b of length 1 is generated which corresponds more or less to the substrate thickness d. Since substrate 1 is positioned relative to line 2b in such a way that line 2b starts at a point outside the substrate, the length L of the section of induced absorption 2c (which extends here from the substrate surface to a defined substrate depth, but not to the reverse (remote) surface 1b) is smaller than the length 1 of focal line 2b. FIG. 3B-3 shows the case in which the substrate 1 (viewed along a direction perpendicular to the beam direction) is positioned above the starting point of focal line 2b so that the length 1 of line 2b is greater than the length L of the section of induced absorption 2c in substrate 1. The focal line thus starts within the substrate and extends beyond the reverse surface 1b. FIG. 3B-4 shows the case in which the focal line length 1 is smaller than the substrate thickness d so that—in the case of a central positioning of the substrate relative to the focal line viewed in the direction of incidence—the focal line starts near the surface 1a within the substrate and ends near the surface 1b within the substrate (e.g. 1=0.75·d).

It is particularly advantageous to position the focal line 2b in such a way that at least one of surfaces 1a, 1b is covered by the focal line, so that the section of induced absorption 2c starts at least on one surface of the substrate. In this way it is possible to achieve virtually ideal cuts while avoiding ablation, feathering and particulation at the surface.

FIG. 4 depicts another applicable optical assembly 6. The basic construction follows the one described in FIG. 3A so that only the differences are described below. The depicted optical assembly is based the use of optics with a non-spherical free surface in order to generate the focal line 2b, which is shaped in such a way that a focal line of defined length 1 is formed. For this purpose, aspheres can be used as optic elements of the optical assembly 6. In FIG. 4, for example, a so-called conical prism, also often referred to as axicon, is used. An axicon is a special, conically cut lens which forms a spot source on a line along the optical axis (or transforms a laser beam into a ring). The layout of such an axicon is generally known to one skilled in the art; the cone angle in the example is 10°. The apex of the axicon labeled here with reference 9 is directed towards the incidence direction and centered on the beam center. Since the focal line 2b produced by the axicon 9 starts within its interior, substrate 1 (here aligned perpendicularly to the main beam axis) can be positioned in the beam path directly behind axicon 9. As FIG. 4 shows, it is also possible to shift substrate 1 along the beam direction due to the optical characteristics of the axicon while remaining within the range of focal line 2b. The section of the induced absorption 2c in the material of substrate 1 therefore extends over the entire substrate depth d.

However, the depicted layout is subject to the following restrictions: Since the region of focal line 2b formed by axicon 9 begins within axicon 9, a significant part of the laser energy is not focused into the section of induced absorption 2c of focal line 2b, which is located within the material, in the situation where there is a separation between axicon 9 and the substrate material or workpiece. Furthermore, length 1 of focal line 2b is related to the beam diameter through the refractive indices and cone angles of axicon 9. This is why, in the case of relatively thin materials (several millimeters), the total focal line is much longer than the substrate thickness, having the effect that much of the laser energy is not focused into the material.

Figure 5A:
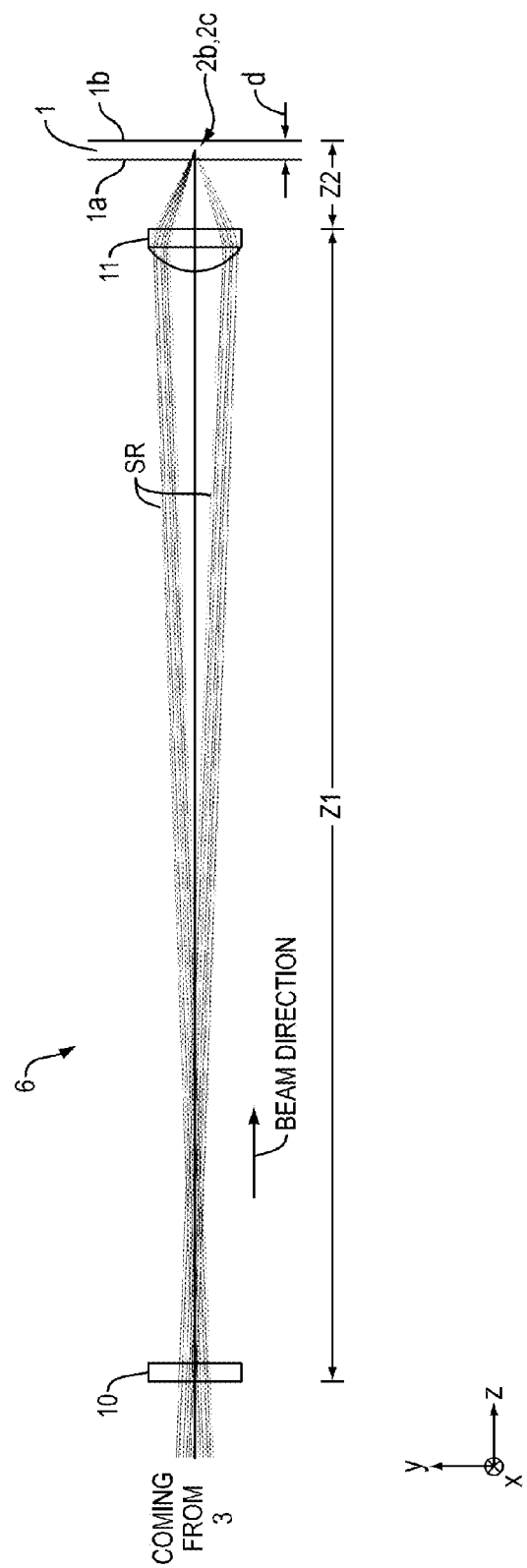

For this reason, it may be desirable to use an optical assembly 6 that includes both an axicon and a focusing lens. FIG. 5A depicts such an optical assembly 6 in which a first optical element with a non-spherical free surface designed to form an laser beam focal line 2b is positioned in the beam path of laser 3. In the case shown in FIG. 5A, this first optical element is an axicon 10 with a cone angle of 5°, which is positioned perpendicularly to the beam direction and centered on laser beam 3. The apex of the axicon is oriented towards the beam direction. A second, focusing optical element, here the plano-convex lens 11 (the curvature of which is oriented towards the axicon), is positioned in the beam direction at a distance Z1 from the axicon 10. The distance Z1, in this case approximately 300 mm, is selected in such a way that the laser radiation formed by axicon 10 circularly incident on the outer radial portion of lens 11. Lens 11 focuses the circular radiation on the output side at a distance Z2, in this case approximately 20 mm from lens 11, on a focal line 2b of a defined length, in this case 1.5 mm. The effective focal length of lens 11 is 25 mm in this embodiment. The circular transformation of the laser beam by axicon 10 is labeled with the reference SR.

FIG. 5B depicts the formation of the focal line 2b or the induced absorption 2c in the material of substrate 1 according to FIG. 5A in detail. The optical characteristics of both elements 10, 11 as well as the positioning of them is selected in such a way that the length 1 of the focal line 2b in beam direction is exactly identical with the thickness d of substrate 1. Consequently, an exact positioning of substrate 1 along the beam direction is required in order to position the focal line 2b exactly between the two surfaces 1a and 1b of substrate 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly (annularly) over a particular outer radial region, which, on the one hand, serves to realize the required numerical aperture and thus the required spot size, and on the other hand, however, the circle of diffusion diminishes in intensity after the required focal line 2b over a very short distance in the center of the spot, as a basically circular spot is formed. In this way, the defect line formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length 1 of focal line 2b can be adjusted via the beam diameter on the axicon. The numerical aperture along the focal line, on the other hand, can be adjusted via the distance Z1 (axicon-lens separation) and via the cone angle of the axicon. In this way, the entire laser energy can be concentrated in the focal line.

If the defect line formation is intended to continue to the back side of the substrate, the circular (annular) illumination still has the advantage that (1) the laser power is used optimally in the sense that most of the laser light remains concentrated in the required length of the focal line and (2) it is possible to achieve a uniform spot size along the focal line—and thus a uniform separation of part from substrate along the focal line—due to the circularly illuminated zone in conjunction with the desired aberration set by means of the other optical functions.

Instead of the plano-convex lens depicted in FIG. 5A, it is also possible to use a focusing meniscus lens or another higher corrected focusing lens (asphere, multi-lens system).

In order to generate very short focal lines 2b using the combination of an axicon and a lens depicted in FIG. 5A, it would be necessary to select a very small beam diameter of the laser beam incident on the axicon. This has the practical disadvantage that the centering of the beam onto the apex of the axicon must be very precise and that the result is very sensitive to directional variations of the laser (beam drift stability). Furthermore, a tightly collimated laser beam is very divergent, i.e. due to the light deflection the beam bundle becomes blurred over short distances.

Figure 6:
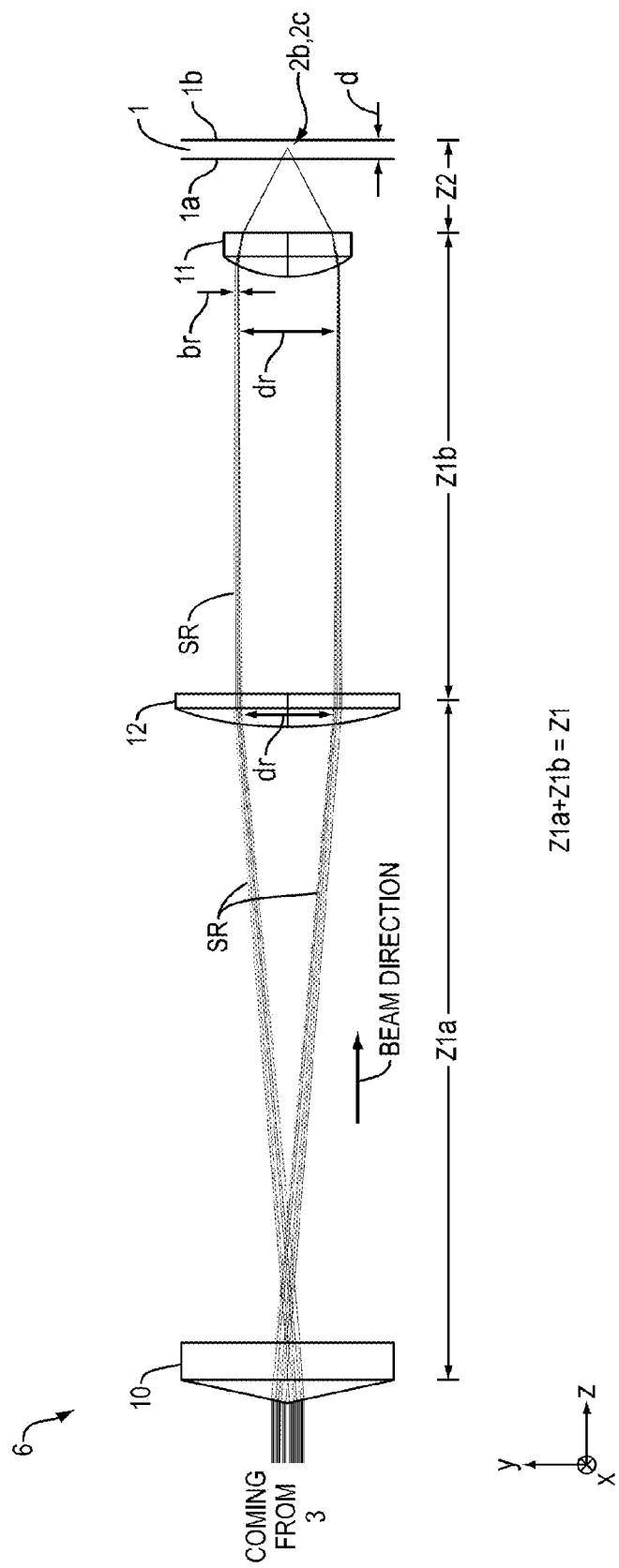
FIG. 6 is a schematic illustration of a fourth embodiment of an optical assembly for laser processing.

As shown in FIG. 6, both effects can be avoided by including another lens, a collimating lens 12 in the optical assembly 6. The additional positive lens 12 serves to adjust the circular illumination of focusing lens 11 very tightly. The focal length f of collimating lens 12 is selected in such a way that the desired circle diameter dr results from distance Z1a from the axicon to the collimating lens 12, which is equal to f. The desired width br of the ring can be adjusted via the distance Z1b (collimating lens 12 to focusing lens 11). As a matter of pure geometry, the small width of the circular illumination leads to a short focal line. A minimum can be achieved at distance f.

The optical assembly 6 depicted in FIG. 6 is thus based on the one depicted in FIG. 5A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as Z1a, the distance of focusing lens 11 from collimating lens 12 as Z1b, and the distance of the focal line 2b from the focusing lens 11 as Z2 (always viewed in beam direction). As shown in FIG. 6, the circular radiation SR formed by axicon 10, which is incident divergently and under the circle diameter dr on the collimating lens 12, is adjusted to the required circle width br along the distance Z1b for an at least approximately constant circle diameter dr at the focusing lens 11. In the case shown, a very short focal line 2b is intended to be generated so that the circle width br of approximately 4 mm at lens 12 is reduced to approximately 0.5 mm at lens 11 due to the focusing properties of lens 12 (circle diameter dr is 22 mm in the example).

In the depicted example, it is possible to achieve a length of the focal line 1 of less than 0.5 mm using a typical laser beam diameter of 2 mm, a focusing lens 11 with a focal length f=25 mm, a collimating lens with a focal length f=150 mm, and choosing distances Z1a=Z1b=140 mm and Z2=15 mm.

FIGS. 7A-7C illustrate the laser-matter interaction at different laser intensity regimes. In the first case, shown in FIG. 7A, the unfocused laser beam 710 goes through a transparent substrate 720 without introducing any modification to it. In this particular case, the nonlinear effect is not present because the laser energy density (or laser energy per unit area illuminated by the beam) is below the threshold necessary to induce nonlinear effects. The higher the energy density, the higher is the intensity of the electromagnetic field. Therefore, as shown in FIG. 7B when the laser beam is focused by spherical lens 730 to a smaller spot size, the illuminated area is reduced and the energy density increases, triggering the nonlinear effect that will modify the material to permit formation of a fault line only in the volume where that condition is satisfied. In this way, if the beam waist of the focused laser is positioned at the surface of the substrate, modification of the surface will occur. In contrast, if the beam waist of the focused laser is positioned below the surface of the substrate, nothing happens at the surface when the energy density is below the threshold of the nonlinear optical effect. But at the focus 740, positioned in the bulk of the substrate 720, the laser intensity is high enough to trigger multi-photon non-linear effects, thus inducing damage to the material.

Finally, in the case of an axicon, as shown in FIG. 7C, the diffraction pattern of an axicon lens 750, or alternatively a Fresnel axicon, creates interference that generates a Bessel-shaped intensity distribution (cylinder of high intensity 760) and only in that volume is the intensity high enough to create nonlinear absorption and modification to the material 720. The diameter of cylinder 760, in which Bessel-shaped intensity distribution is high enough to create nonlinear absorption and modification to the material, is also the spot diameter of the laser beam focal line, as referred to herein. Spot diameter D of a Bessel beam can be expressed as $D=(2.4048\lambda)/(2\pi B)$, where $\lambda$ is the laser beam wavelength and B is a function of the axicon angle. Calculated or measured spot diameters can be averaged, and average spot diameters in embodiments described herein can be in a range of between about 0.1 micron and about 5 microns, for example.

Laser and Optical System:

For the purpose of cutting and extracting parts from a 3D molded Gorilla® glass part or other 3D workpiece in a representative demonstration, a process was developed that uses a 1064 nm picosecond pulsed laser in combination with line-focus beam forming optics to create lines of damage (also referred to herein as defect lines, damage tracks, or fault lines) in a Gorilla® glass substrate.

Figure 8B:
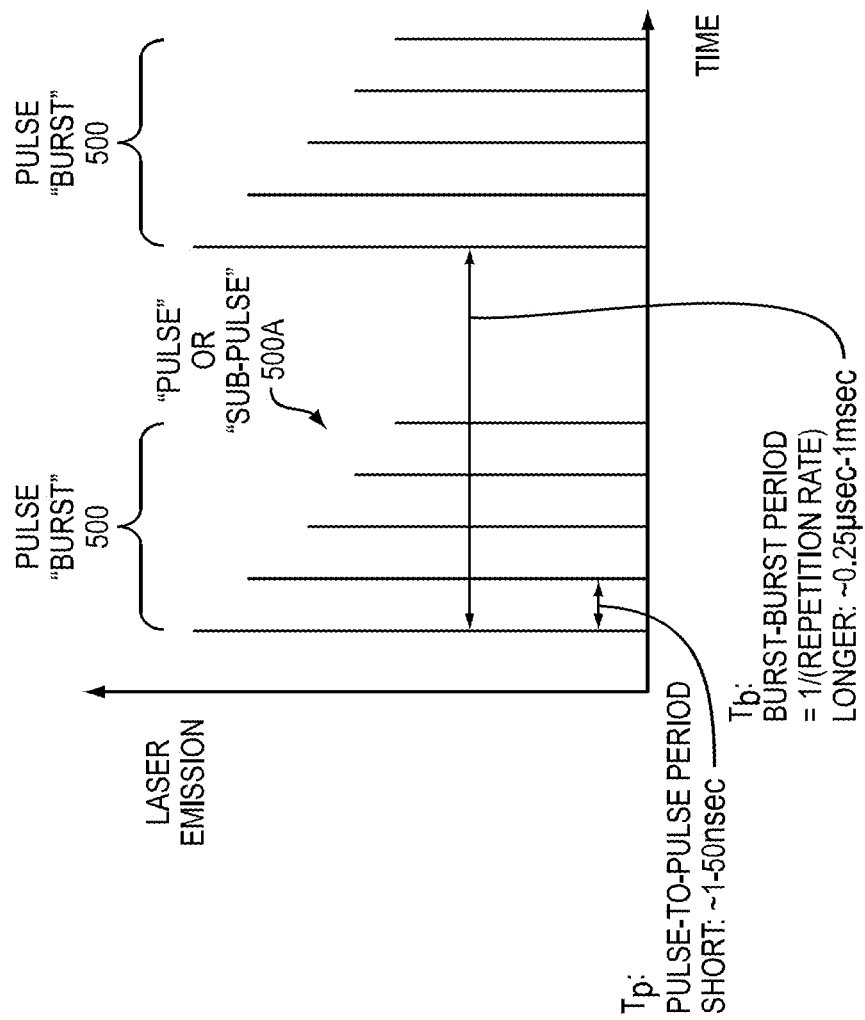

As illustrated in FIG. 8A and FIG. 8B, according to selected embodiments described herein, the picosecond laser creates a "burst" 500 of pulses 500A, sometimes also called a "burst pulse". Bursting is a type of laser operation where the emission of pulses is not in a uniform and steady stream but rather in tight clusters of pulses. Each "burst" 500 may contain multiple pulses 500A (such as 2 pulses, 3 pulses, 4 pulses, 5 pulses, 10, 15, 20, or more) of very short duration $T_d$ up to 100 psec (for example, 0.1 psec, 5 psec, 10 psec, 15 psec, 18 psec, 20 psec, 22 psec, 25 psec, 30 psec, 50 psec, 75 psec, or therebetween). The pulse duration is generally in a range from about 1 psec to about 1000 psec, or in a range from about 1 psec to about 100 psec, or in a range from about 2 psec to about 50 psec, or in a range from about 5 psec to about 20 psec. These individual pulses 500A within a single burst 500 can also be termed "sub-pulses," which simply denotes the fact that they occur within a single burst of pulses. The energy or intensity of each laser pulse 500A within the burst may not be equal to that of other pulses within the burst, and the intensity distribution of the multiple pulses within a burst 500 may follow an exponential decay in time governed by the laser design. Preferably, each pulse 500A within the burst 500 of the exemplary embodiments described herein are separated in time from the subsequent pulse in the burst by a duration $T_p$ from 1 nsec to 50 nsec (e.g. 10-50 nsec, or 10-40 nsec, or 10-30 nsec, with the time often governed by the laser cavity design. For a given laser, the time separation $T_p$ between each pulses (pulse-to-pulse separation) within a burst 500 is relatively uniform (±10%). For example, in some embodiments, each pulse is separated in time from the subsequent pulse by approximately 20 nsec (50 MHz pulse repetition frequency). For example, for a laser that produces pulse-to-pulse separation $T_p$ of about 20 nsec, the pulse-to-pulse separation $T_p$ within a burst is maintained within about ±10%, or is about ±2 nsec. The time between each "burst" (i.e., time separation $T_b$ between bursts) will be much longer (e.g., $0.25 \leq T_b \leq 1000$ microseconds, for example 1-10 microseconds, or 3-8 microseconds,) For example in some of the exemplary embodiments of the laser described herein it is around 5 microseconds for a laser repetition rate or frequency of about 200 kHz. The laser repetition rate is also referred to as burst repetition frequency or burst repetition rate herein, and is defined as the time between the first pulse in a burst to the first pulse in the subsequent burst. In other embodiments, the burst repetition frequency is in a range of between about 1 kHz and about 4 MHz, or in a range between about 1 kHz and about 2 MHz, or in a range of between about 1 kHz and about 650 kHz, or in a range of between about 10 kHz and about 650 kHz. The time $T_b$ between the first pulse in each burst to the first pulse in the subsequent burst may be 0.25 microsecond (4 MHz burst repetition rate) to 1000 microseconds (1 kHz burst repetition rate), for example 0.5 microseconds (2 MHz burst repetition rate) to 40 microseconds (25 kHz burst repetition rate), or 2 microseconds (500 kHz burst repetition rate) to 20 microseconds (50 kHz burst repetition rate). The exact timings, pulse durations, and repetition rates can vary depending on the laser design and user-controllable operating parameters. Short pulses ($T_d$<20 psec and preferably $T_d \leq 15$ psec) of high intensity have been shown to work well.

The required energy to modify the material can be described in terms of the burst energy—the energy contained within a burst (each burst 500 contains a series of pulses 500A), or in terms of the energy contained within a single laser pulse (many of which may comprise a burst). For these applications, the energy per burst (per millimeter of the material to be cut) can be from 10-2500 µJ, or from 20-1500 µJ, or from 25-750 µJ, or from 40-2500 µJ, or from 100-1500 µJ, or from 200-1250 µJ, or from 250-1500 µJ, or from 250-750 µJ. The energy of an individual pulse within the burst will be less, and the exact individual laser pulse energy will depend on the number of pulses 500A within the burst 500 and the rate of decay (e.g., exponential decay rate) of the laser pulses with time as shown in FIG. 8A and FIG. 8B. For example, for a constant energy/burst, if a pulse burst contains 10 individual laser pulses 500A, then each individual laser pulse 500A will contain less energy than if the same burst pulse 500 had only 2 individual laser pulses.

The use of lasers capable of generating such pulse bursts is advantageous for cutting or modifying transparent materials, for example glass. In contrast with the use of single pulses spaced apart in time by the repetition rate of a single-pulsed laser, the use of a burst pulse sequence that spreads the laser energy over a rapid sequence of pulses within burst 500 allows access to larger timescales of high intensity interaction with the material than is possible with single-pulse lasers. While a single-pulse can be expanded in time, conservation of energy dictates that as this is done, the intensity within the pulse must drop as roughly one over the pulse width. Hence if a 10 psec single pulse is expanded to a 10 nsec pulse, the intensity drops by roughly three orders of magnitude. Such a reduction can reduce the optical intensity to the point where non-linear absorption is no longer significant and the light-material interaction is no longer strong enough to allow for cutting. In contrast, with a burst pulse laser, the intensity during each pulse or sub-pulse 500A within the burst 500 can remain very high—for example three pulses 500A with pulse duration $T_d$ 10 psec that are spaced apart in time by a separation $T_p$ of approximately 10 nsec still allows the intensity within each pulse to be approximately three times higher than that of a single 10 psec pulse, while the laser is allowed to interact with the material over a timescale that is three orders of magnitude larger. This adjustment of multiple pulses 500A within a burst thus allows manipulation of timescale of the laser-material interaction in ways that can facilitate greater or lesser light interaction with a pre-existing plasma plume, greater or lesser light-material interaction with atoms and molecules that have been pre-excited by an initial or previous laser pulse, and greater or lesser heating effects within the material that can promote the controlled growth of defect lines (perforations). The amount of burst energy required to modify the material will depend on the substrate material composition and the length of the line focus used to interact with the substrate. The longer the interaction region, the more the energy is spread out, and the higher the burst energy that will be required.)

A defect line or a hole is formed in the material when a single burst of pulses strikes essentially the same location on the glass. That is, multiple laser pulses within a single burst can produce a single defect line or a hole location in the glass. Of course, if the glass is translated (for example by a constantly moving stage) or the beam is moved relative to the glass, the individual pulses within the burst cannot be at exactly the same spatial location on the glass. However, they are well within 1 µm of one another—i.e., they strike the glass at essentially the same location. For example, they may strike the glass at a spacing sp where 0<sp≤500 nm from one another. For example, when a glass location is hit with a burst of 20 pulses the individual pulses within the burst strike the glass within 250 nm of each other. Thus, in some embodiments 1 nm<sp<250 nm. In some embodiments 1 nm<sp<100 nm.

In one embodiment, a Corning glass code 2319 Gorilla® glass substrate with 0.55 mm thickness was positioned so that it was within the region of the focal line produced by the optical system. with a focal line of about 1 mm in length, and a picosecond laser that produces output power of about 40 W or greater at a burst repetition rate or frequency of 200 kHz (about 200 microJoules/burst measured at the material), the optical intensities (energy densities) in the focal line region can easily be high enough to create non-linear absorption in the substrate material. A region of damaged, ablated, vaporized, or otherwise modified material within the substrate was created in the glass that approximately followed the linear region of high intensity.

Hole or Damage Track Formation:

If the substrate has sufficient stress (e.g., with ion exchanged glass), then the part will spontaneously separate from the substrate along the path of perforated damage (fault line or contour) traced out by the laser process. However, if there is not a lot of stress inherent to the substrate, then the picosecond laser will simply form damage tracks (defect lines) in the substrate. These damage tracks generally take the form of holes with interior dimensions (e.g. diameters) in the range of about 0.2 microns to 2 microns, for example 0.5-1.5 microns Preferably the holes are very small (single microns or less) in dimension.

The defect lines may or may not perforate the entire thickness of the material, and may or may not be a continuous opening throughout the depth of the material. FIG. 1C shows an example of such tracks or defect lines perforating the entire thickness of a workpiece of 700 microns thick Gorilla® glass substrate. The perforations or damage tracks are observed through the side of a cleaved edge. The tracks through the material are not necessarily through holes. There are often regions of glass that plug the holes, but they are generally small in size, on the order of microns, for example.

Note that upon separation of the part, fracture occurs along the defect lines to provide a part having a perimeter surface (edge) with features derived from the defect lines. Before separation, the defect lines are generally cylindrical in shape. Upon separation of the part, the defect lines fracture and remnants of the defect lines are evident in the contours of the perimeter surface of the separated part. In an ideal model, the defect lines are cleaved in half upon separation so that the perimeter surface of the separated part includes serrations corresponding to half-cylinders. In practice, separation may deviate from an ideal model and the serrations of the perimeter surface may be an arbitrary fraction of the shape of the original defect line. Irrespective of the particular form, features of the perimeter surface will be referred to as defect lines to indicate the origin of their existence.

It is also possible to perforate stacked sheets of glass or other materials. In this case the focal line length needs to be longer than the stack height.

The lateral spacing (pitch) between the defect lines is determined by the pulse rate of the laser as the substrate is translated underneath the focused laser beam. Only a single picosecond laser pulse or burst is usually necessary to form an entire hole, but multiple pulses or bursts may be used if desired. To form holes at different pitches or defect line separations, the laser can be triggered to fire at longer or shorter intervals. For cutting operations, the laser triggering generally is synchronized with the stage driven motion of the substrate beneath the beam, so laser pulses are triggered at a fixed interval, such as every 1 microns, or every 5 microns. The exact spacing between adjacent defect lines is determined by the material properties that facilitate crack propagation from perforated hole to perforated hole, given the stress level in the substrate. However, in contrast to cutting a substrate, it is also possible to use the same method to only perforate the material. In this case, the holes (or damage tracks, or perforations) may be separated by larger spacings (e.g., a 7 micron pitch or greater).

The laser power and lens focal length (which determines the focal line length and hence power density) are particularly important parameters to ensure full penetration of the glass and low surface and sub-surface damage.

In general, the higher the available laser power, the faster the material can be cut with the above process. The process(s) disclosed herein can cut glass at a cutting speed of 0.25 msec, or faster. A cut speed (or cutting speed) is the rate the laser beam moves relative to the surface of the substrate material (e.g., glass) while creating multiple defect lines holes. High cut speeds, such as, for example 400 mm/sec, 500 mm/sec, 750 mm/sec, 1 msec, 1.2 msec, 1.5 msec, or 2 msec, or even 3.4 msec to 4 m/sec are often desired in order to minimize capital investment for manufacturing, and to optimize equipment utilization rate. The laser power is equal to the burst energy multiplied by the burst repetition frequency (rate) of the laser. In general, to cut glass materials at high cutting speeds, the defect lines are typically spaced apart by 1-25 μm, in some embodiments the spacing is preferably 3 μm or larger—for example 3-12 μm, or for example 5-10 μm.

For example, to achieve a linear cutting speed of 300 mm/sec, 3 μm hole pitch corresponds to a pulse burst laser with at least 100 kHz burst repetition rate. For a 600 mm/sec cutting speed, a 3 μm pitch corresponds to a burst-pulsed laser with at least 200 kHz burst repetition rate. A pulse burst laser that produces at least 40 μJ/burst at 200 kHz, and cuts at a 600 mm/s cutting speed needs to have a laser power of at least 8 Watts. Higher cut speeds require accordingly higher laser powers.

For example, a 0.4 msec cut speed at 3 μm pitch and 40 μJ/burst would require at least a 5 W laser, a 0.5 msec cut speed at 3 μm pitch and 40 μJ/burst would require at least a 6 W laser. Thus, preferably the laser power of the pulse burst picosecond laser is 6 W or higher, more preferably at least 8 W or higher, and even more preferably at least 10 W or higher. For example, in order to achieve a 0.4 msec cut speed at 4 μm pitch (defect line spacing, or damage tracks spacing) and 100 μJ/burst, one would require at least a 10 W laser, and to achieve a 0.5 msec cut speed at 4 μm pitch and 100 μJ/burst, one would require at least a 12 W laser. For example, a to achieve a cut speed of 1 m/sec at 3 μm pitch and 40 μJ/burst, one would require at least a 13 W laser. Also, for example, 1 m/sec cut speed at 4 μm pitch and 400 μJ/burst would require at least a 100 W laser.

The optimal pitch between defect lines (damage tracks) and the exact burst energy is material dependent and can be determined empirically. However, it should be noted that raising the laser pulse energy or making the damage tracks at a closer pitch are not conditions that always make the substrate material separate better or with improved edge quality. A pitch that is too small (for example <0.1 micron, or in some exemplary embodiments <1 μm, or in other embodiments <2 μm) between defect lines (damage tracks) can sometimes inhibit the formation of nearby subsequent defect lines (damage tracks), and often can inhibit the separation of the material around the perforated contour. An increase in unwanted micro cracking within the glass may also result if the pitch is too small. A pitch that is too long (e.g. >50 μm, and in some glasses >25 μm or even >20 μm) may result in "uncontrolled microcracking"—i.e., where instead of propagating from defect line to defect line along the intended contour, the microcracks propagate along a different path, and cause the glass to crack in a different (undesirable) direction away from the intended contour. This may ultimately lower the strength of the separated part since the residual microcracks constitute flaws that weaken the glass. A burst energy for forming defect lines that is too high (e.g., >2500 µJ/burst, and in some embodiments >500 µJ/burst) can cause "healing" or re-melting of previously formed defect lines, which may inhibit separation of the glass. Accordingly, it is preferred that the burst energy be <2500 µJ/burst, for example, ≤500 µJ/burst. Also, using a burst energy that is too high can cause formation of microcracks that are extremely large and create structural imperfections that can reduce the edge strength of the part after separation. A burst energy that is too low (e.g. <40 µJ/burst) may result in no appreciable formation of defect lines within the glass, and hence may necessitate especially high separation force or result in a complete inability to separate along the perforated contour.

Typical exemplary cutting rates (speeds) enabled by this process are, for example, 0.25 msec and higher. In some embodiments, the cutting rates are at least 300 mm/sec. In some embodiments, the cutting rates are at least 400 mm/sec, for example, 500 mm/sec to 2000 mm/sec, or higher. In some embodiments the picosecond (ps) laser utilizes pulse bursts to produce defect lines with periodicity between 0.5 µm and 13 µm, e.g. between 0.5 and 3 µm. In some embodiments, the pulsed laser has laser power of 10 W-100 W and the material and/or the laser beam are translated relative to one another at a rate of at least 0.25 msec; for example, at the rate of 0.25 msec to 0.35 m/sec, or 0.4 msec to 5 msec. Preferably, each pulse burst of the pulsed laser beam has an average laser energy measured at the workpiece greater than 40 µJ per burst per mm thickness of workpiece. Preferably, each pulse burst of the pulsed laser beam has an average laser energy measured at the workpiece greater of less than 2500 µJ per burst per mm thickness of workpiece, and preferably lass than about 2000 µJ per burst per mm thickness of workpiece, and in some embodiments less than 1500 µJ per burst per mm thickness of workpiece; for example, not more than 500 µJ per burst per mm thickness of workpiece.

We discovered that much higher (5 to 10 times higher) volumetric pulse energy density (µJ/µm³) is required for perforating alkaline earth boroaluminosilicate glasses with low or no alkali content. This can be achieved, for example, by utilizing pulse burst lasers, preferably with at least 2 pulses per burst and providing volumetric energy densities within the alkaline earth boroaluminosilicate glasses (with low or no alkali) of about 0.05 µJ/µm³ or higher, e.g., at least 0.1 µJ/µm³, for example 0.1-0.5 µJ/µm³.

Accordingly, it is preferable that the laser produces pulse bursts with at least 2 pulses per burst. For example, in some embodiments the pulsed laser has a power of 10 W-150 W (e.g., 10 W-100 W) and produces pulse bursts with at least 2 pulses per burst (e.g., 2-25 pulses per burst). In some embodiments the pulsed laser has a power of 25 W-60 W, and produces pulse bursts with at least 2-25 pulses per burst, and periodicity or distance between the adjacent defect lines produced by the laser bursts is 2-10 µm. In some embodiments, the pulsed laser has a power of 10 W-100 W, produces pulse bursts with at least 2 pulses per burst, and the workpiece and the laser beam are translated relative to one another at a rate of at least 0.25 m/sec. In some embodiments the workpiece and/or the laser beam are translated relative to one another at a rate of at least 0.4 m/sec.

For example, for cutting 0.7 mm thick non-ion exchanged Corning code 2319 or code 2320 Gorilla® glass, it is observed that pitches of 3-7 µm can work well, with pulse burst energies of about 150-250 µJ/burst, and burst pulse numbers that range from 2-15, and preferably with pitches of 3-5 µm and burst pulse numbers (number of pulses per burst) of 2-5.

At 1 m/sec cut speeds, the cutting of Eagle XG® glass or 2320 Gorilla®, glass typically requires utilization of laser powers of 15-84 W, with 30-45 W often being sufficient. In general, across a variety of glass and other transparent materials, applicants discovered that laser powers between 10 W and 100 W are preferred to achieve cutting speeds from 0.2-1 m/sec, with laser powers of 25-60 W being sufficient (or optimum) for many glasses. For cutting speeds of 0.4 m/sec to 5 m/sec, laser powers should preferably be 10 W-150 W, with burst energy of 40-750 µJ/burst, 2-25 bursts per pulse (depending on the material that is cut), and defect line separation (pitch) of 3 to 15 µm, or 3-10 µm. The use of picosecond pulse burst lasers would be preferable for these cutting speeds because they generate high power and the required number of pulses per burst. Thus, according to some exemplary embodiments, the pulsed laser produces 10 W-100 W of power, for example 25 W to 60 W, and produces pulse bursts at least 2-25 pulses per burst and the distance between the defect lines is 2-15 µm; and the laser beam and/or workpiece are translated relative to one another at a rate of at least 0.25 m/sec, in some embodiments at least 0.4 msec, for example 0.5 msec to 5 msec, or faster.

Figure 8C:
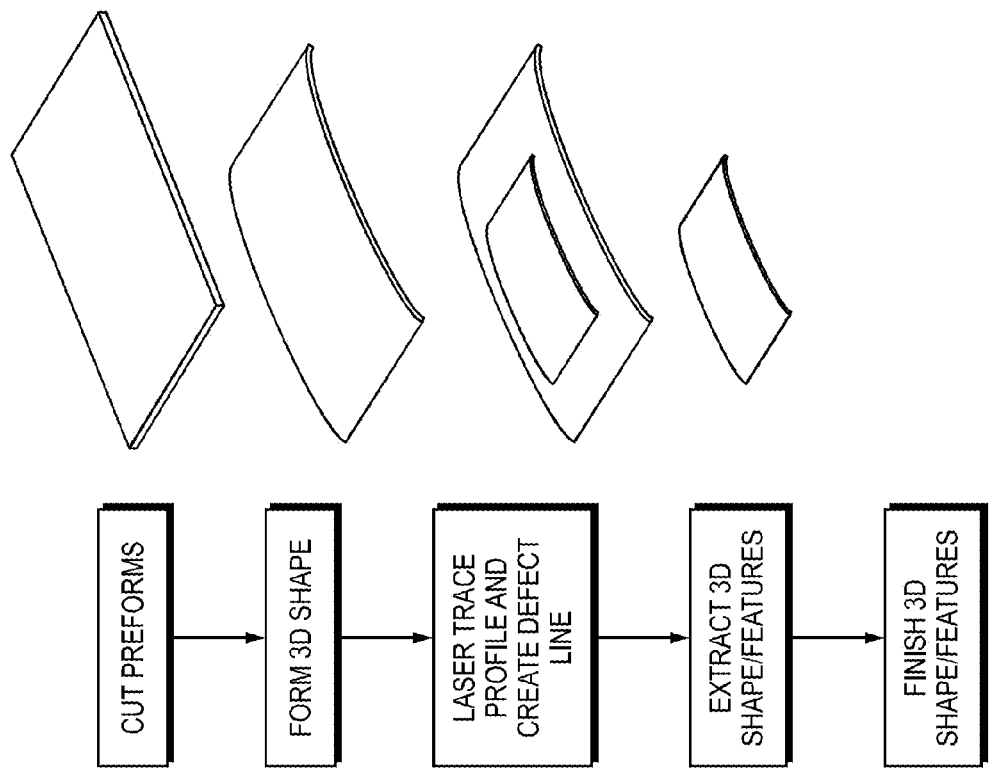
FIG. 8C illustrates processing flat glass panels into 3D shaped parts according to an embodiment method.

Cutting and Extracting 3D Molded Shapes:

FIG. 8C illustrates a process for cutting and extracting a 3D shape out of large pre-formed panel workpiece of 0.55 mm thick Corning code 2319 Gorilla® glass. A large, preformed cut glass sheet is formed into a 3D shaped, large-radius curved panel by sagging it using a template. This 3D shape is placed under the laser beam, and defect lines as described herein were created on the curved glass by gradually tracing the same shape described hereinafter in conjunction with FIG. 9, while stepping down the relative distance between the surface of the glass shape and the line-focus (focal line). The stepping down of the relative distance between the surface and the focal line is further described hereinafter in conjunction with FIGS. 10A and 10B. On each pass, only a small portion of the glass overlapped with the line-focus of the laser and therefore created the defect line. After each complete tracing of a rectangular shape with rounded corners (rounding radius R2=12 mm), the distance was changed or stepped by 200 microns. When the complete shape was imprinted with defect lines on the curved glass shape, extraction of the final part was achieved by breaking it apart manually by using release lines (not shown in the drawing). The part has a length L, a width W, and a thickness or height h. The value R1 is a radius of curvature for the formed part that, together with the length L, determines the thickness h.

Figure 9:
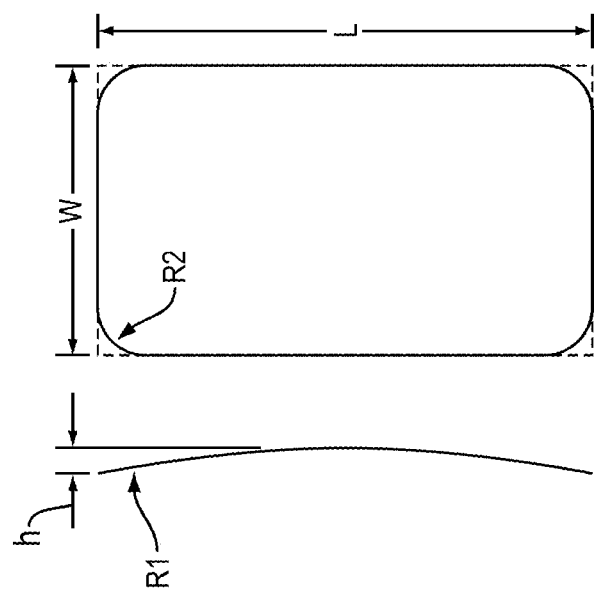
FIG. 9 illustrates a finished part made from sagged unstrengthened Gorilla® 2319 according to an embodiment method.

FIG. 9 illustrates a finished part processed, according to the processing stages previously described in conjunction with FIG. 8, from sagged, unstrengthened Gorilla® 2319.

FIG. 10A illustrates a process to generate defect lines following a traced path at several relative distances between the glass and laser focal line. At each relative distance or separation between the 3D glass surface and the laser focal line, the rectangular shape with rounded corners is traced all around. Then the relative separation is stepped down by 200 microns, and the same shape is traced again. The process is repeated until the defect lines are completely defined in the curved glass panel. The step scans can also be referred to as passes. Thus, in one or more passes, the workpiece and laser beam can be translated relative to each other, the laser beam focal line intersecting with the workpiece along the contour path illustrated in the top of FIG. 10A in four different planes. When the laser beam and workpiece are stepped, or translated with respect to one another in a direction perpendicular to one of the four planes, for example, the laser beam focal plane intersects with another of the planes in the workpiece at the contour path. When as sufficient number of defect lines are produced in each plane around the contour in one or more passes, a part defined by the contour can be separated from the workpiece. The number of defect lines is sufficient when separation is facilitated—whether it is separation as a result of the laser beam focal line alone or whether separation further involves mechanical force or applying a separate infrared laser beam or other steps.

Figure 10B:
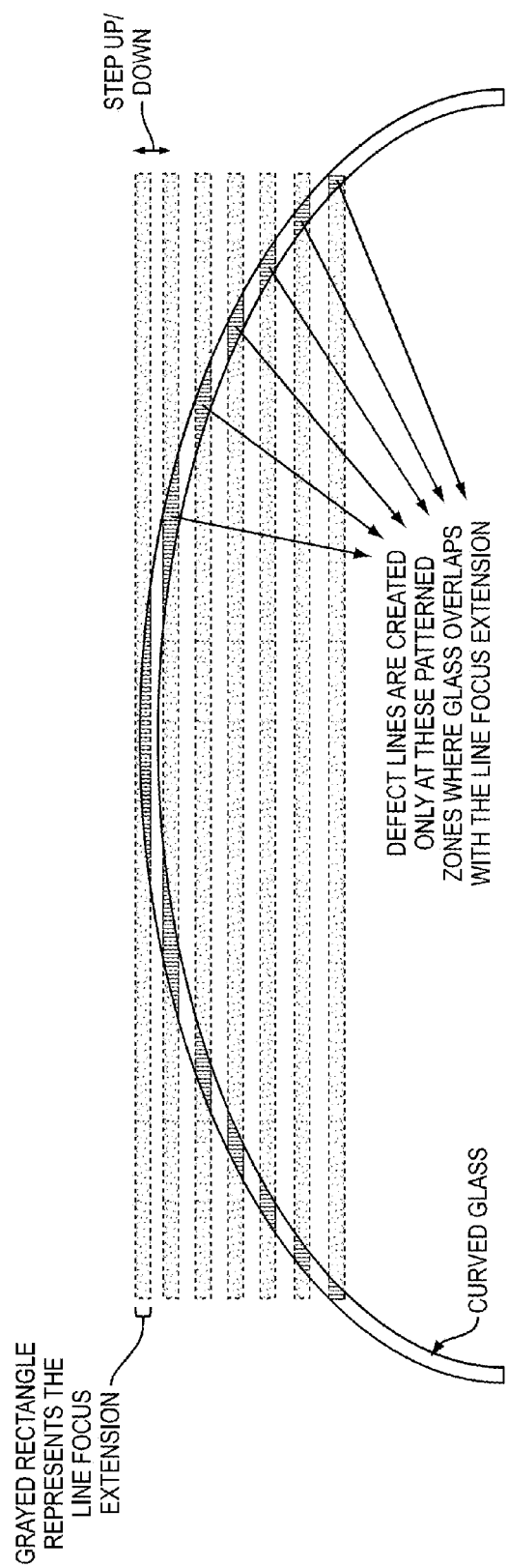
FIG. 10B is an exaggerated illustration of how defect lines are created only at zones where the glass thickness is within the extension of the line focus. In this case, line focus extension (or length) was about 1 mm and the steps were about 100 microns. There is overlap between adjacent step scans of the rectangle.

FIG. 10B is a higher magnification illustration of how defect lines are created only at zones where the glass thickness is within the extension of the line focus, or focal line, for scan in a given plane. It should be noted that in some cases, there can be overlap between scans in different planes. For example, in one example case, the line focus extension (or focal line length) was about 1 mm, and the steps were about 100 microns. Thus, the laser beam focal line in later step scans (or passes) had overlap with the defect line created in previous step scans (or passes).

Figure 11:
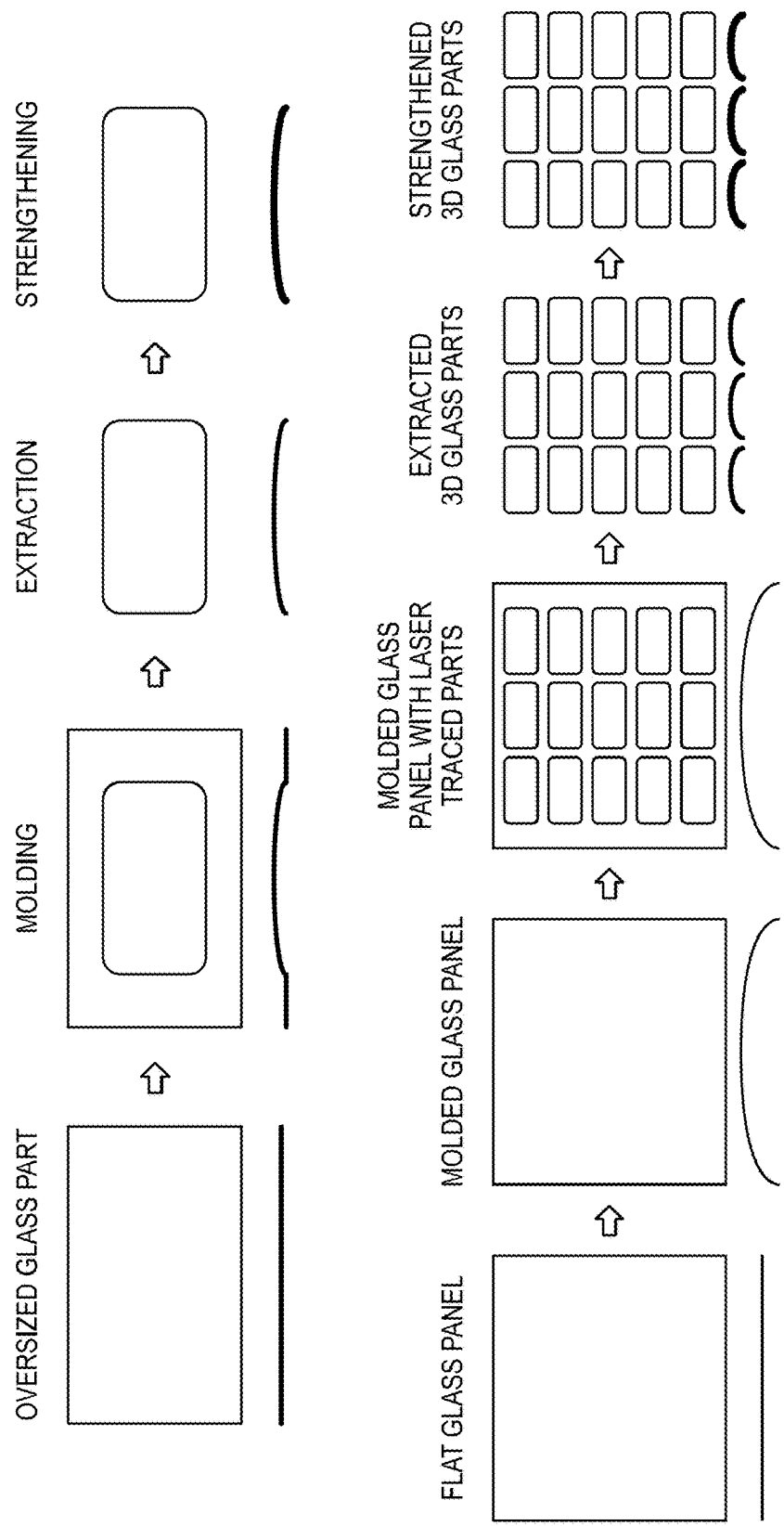
FIG. 11 illustrates individual parts being formed and extracted from an oversized glass part (top row) and a method to scale up the process using the same laser method (bottom row).

FIG. 11 illustrates how a cutting and extraction process can be scaled up to create multiple parts. The top row of FIG. 11 illustrates stages of forming and extracting an individual part from an oversized glass part or workpiece, as described above in conjunction with FIGS. 8-10B. The top row also illustrates strengthening the glass part or workpiece following extraction. The bottom row of FIG. 11 illustrates, in parallel, corresponding stages for forming, extracting, and strengthening multiple glass parts using methods similar to those illustrated in the top row of FIG. 11.

Figure 12:
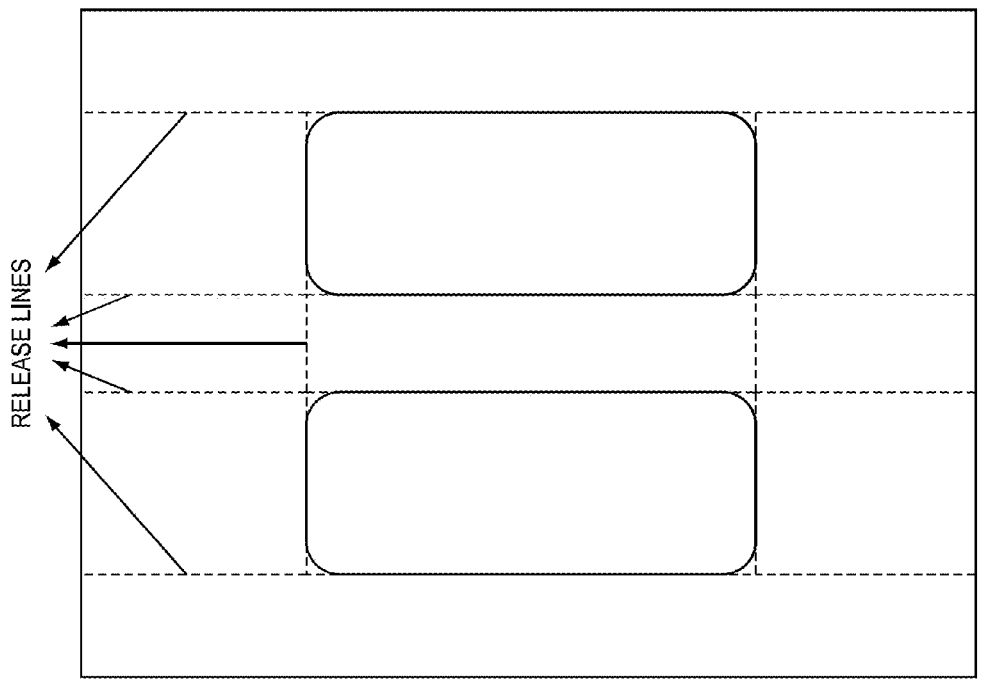
FIG. 12 illustrates extraction of multiple parts using a disclosed method.

FIG. 12 illustrates two formed and separated parts or workpieces similar to the part illustrated in FIG. 9, but in the instance of FIG. 12, two rectangular shapes were traced simultaneously. The traced rectangles and the respective release lines in FIG. 12 also traced with defect lines by the laser and used to separate the desired rounded-corner rectangular parts from the substrate panel. Sagged, 0.55 mm thick Corning code 2319 Gorilla® glass shaped into curved glass with radius of 500 mm was also used for the demonstration illustrated in FIG. 12. The two rectangles have the same 3D curved shape and the corner radii of 12 mm that were used for the part of FIG. 9.

The laser conditions and speed used for the demonstrations described above are summarized below for reference. To separate the parts from the glass matrix, forces were manually applied at the release lines. The forces caused breaks at the perforation lines (defect lines) and propagation of cracks along the fault line that eventually separated the shapes from the glass matrix.

Input beam diameter to axicon lens ~2 mm
Axicon angle=10 degrees
Initial collimating lens focal length=125 mm
Final objective lens focal length=40 mm
incident beam convergence angle=12.75 degrees
Focus set between zero and 10 mm, varying in steps of 200 microns each tracing.
Laser power at 75% of full power (~30 Watts)
Pulse repetition rate of the laser=200 kHz.
3 pulses/burst
Pitch=6 microns
Multiple passes of the same trace shown in FIG. 9.
Motion stage speed=12 m/min=200 mm/s As an alternative to the process just described, another embodiment utilizing a defocused $CO_2$ laser to aid in releasing the parts has been demonstrated. The defocused $CO_2$ laser follows the picosecond laser as it traces the desired contour (fault line) to effect separation of the part from the surrounding substrate matrix. The thermal stress induced by the defocused $CO_2$ laser is enough to initiate and propagate cracks that lead to separation of the part along the desired contour defined by the fault line, thereby releasing the shaped part from the substrate panel. For this case, the best results were found for the following optics and laser parameters:

Picosecond laser
Input beam diameter to axicon lens ~2 mm
Axicon angle=10 degrees
Initial collimating lens focal length=125 mm
Final objective lens focal length=40 mm
Incident beam convergence angle=12.75 degrees
Focus set between zero and 10 mm, varying in steps of 200 microns each tracing.
Laser power at 75% of full power (~30 Watts)
Pulse repetition rate of the laser=200 kHz.
3 pulses/burst
Pitch=6 microns
Multiple pass of same trace shown in FIG. 9.
Motion stage speed=12 m/min=200 mm/s
$CO_2$ laser
Laser translation speed: 130 mm/s
Laser power=100%
Pulse duration 13 microseconds (95% duty cycle)
Laser modulation frequency 20 kHz
Laser beam defocus is 21 mm
Single pass
Alternative process to form and extract 3D parts from a thermally sagged glass panel.

Figure 13:
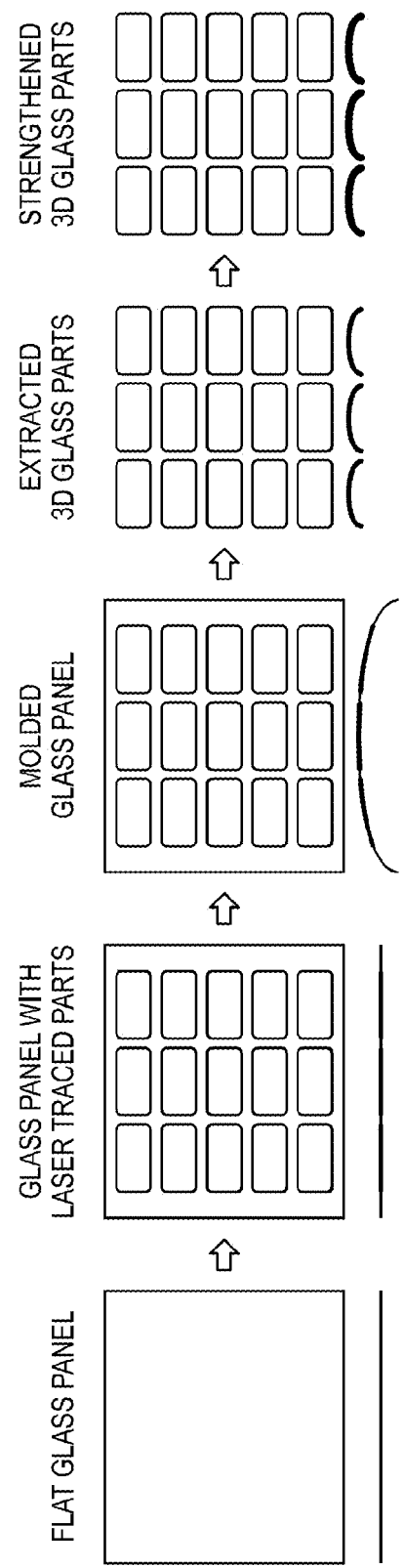
FIG. 13 illustrates an alternative process to form and extract 3D parts from a thermally sagged glass panel.

FIG. 13 illustrates stages in an alternative method of extracting the 3D shapes. The defect lines are created (laser traced) on the flat glass substrate panel before it is sagged and pre-formed. After the thermal sagging process, residual stress around the defect lines creates tension (tensile forces) that helps to propagate a crack until the shapes are released.

Figure 14:
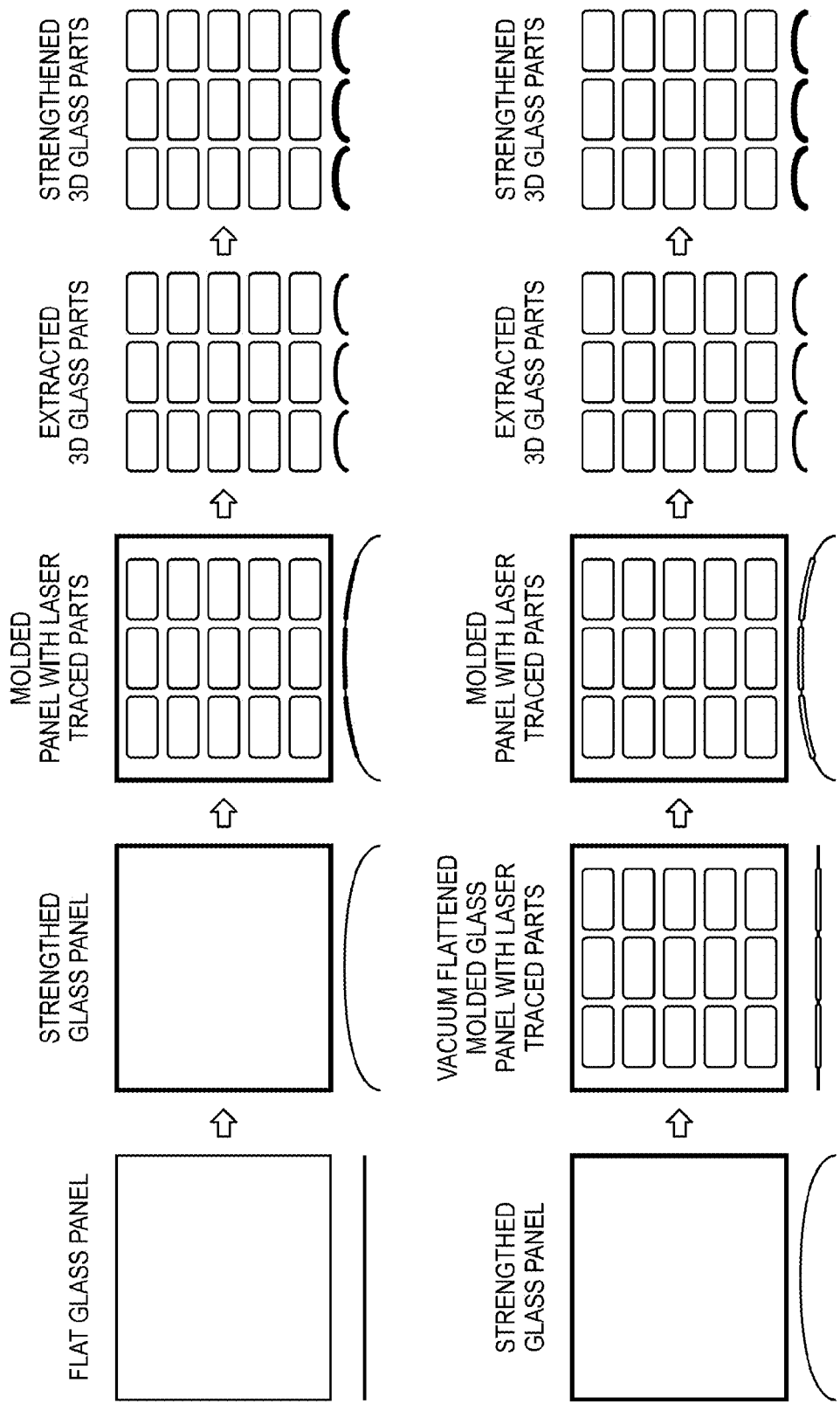
FIG. 14 illustrates another alternative process to form, strengthen, and extract 3D parts from a thermally sagged glass panel.

FIG. 14 illustrates an embodiment process to form, strengthen, and extract 3D parts from a thermally sagged glass panel. As illustrated in FIG. 14, methods such as those described above also work quite well for separating a variety of flat strengthened Corning code 2319 Gorilla® glass with different levels of ion-exchanging and compressive stress. The 3D parts can be directly created and released from an oversized substrate or a full panel that has already been strengthened by ion-exchange. The fact that the glass is pre-strengthened can facilitate release of the part from the substrate without the need of an infrared laser such as a $CO_2$ laser.

Cover glasses with 3D surfaces are being developed for handheld products such as cell phones, for example. However, forming a 3D part from thin LCD glass, for example, becomes more difficult where curvature radii are smaller. A radius of curvature of 10 mm is relatively easy to achieve with thin LCD glass, for example. However, 3D dish-shaped parts with smaller radii such as 5 mm or 2 mm, for example, are more difficult to produce with existing methods, because the glass is typically so hot in existing methods that to achieve good 2 mm corner radii, surface defects occur. Vacuum and pressure can even be required to force the glass into such tight features of molds. Further, to scale up production sizes and volumes, large formed sheets of thin glass are typically used for cost effectiveness, and creating tight corner radii over an array of parts can be even more challenging. Embodiment methods disclosed herein can facilitate production of glass parts with 3D surfaces having small radii of curvature, as further described in conjunction with FIGS. 15A-B and FIGS. 16A-D.

Figure 15A:
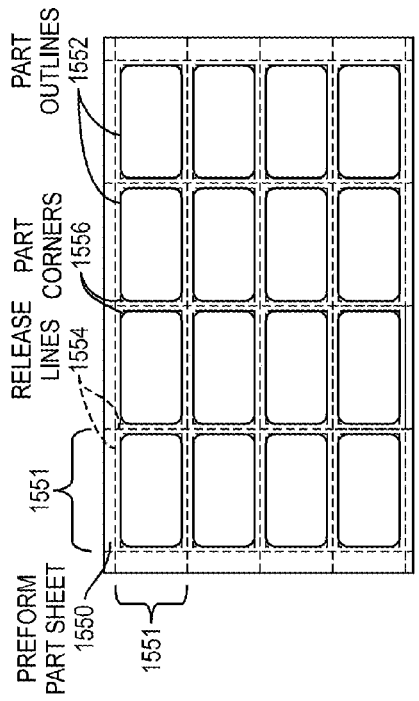
FIG. 15A is an illustration of a preform sheet laser perforated according to embodiment methods to facilitate molding of glass parts with small radii of curvature.

FIG. 15A is an illustration of a preform sheet 1550 of multiple parts 1551. The sheet 1550 is laser perforated (defect lines are created) according to embodiment methods to facilitate molding of glass parts with small radii of curvature. In particular, release lines 1554 are laser perforated according to methods disclosed above to facilitate singulation of individual part preforms 1551 with individual parts. Part outlines 1552 are also laser perforated to facilitate subsequent removal of parts from singulated preforms following molding of the glass parts 1552 to have 3D curved surfaces. It should be noted that in other embodiments, molding occurs with the entire preform sheet 1550 intact.

Figure 15B:
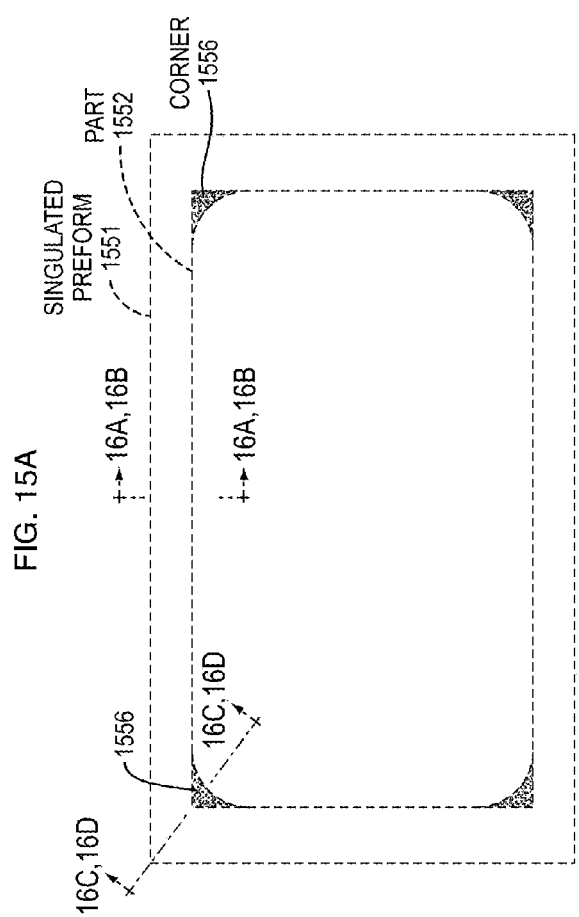
FIG. 15B is an illustration of one singulated preform separated from the sheet illustrated in FIG. 15A.

FIG. 15B is an illustration of one singulated preform separated from the sheet illustrated in FIG. 15A. Also illustrated in FIG. 15B are the corners 1556 of the part, which are laser perforated multiple times to facilitate molding the corners with small radii of curvature, as further described hereinafter in connection with the corner section view of FIGS. 16C-D. Not shown in FIG. 15B are other laser perforations that facilitate molding further 3D curvature on the surface of the glass part 1552 as further described hereinafter in connection with the side section view of FIGS. 16A-B.

Figure 16A:
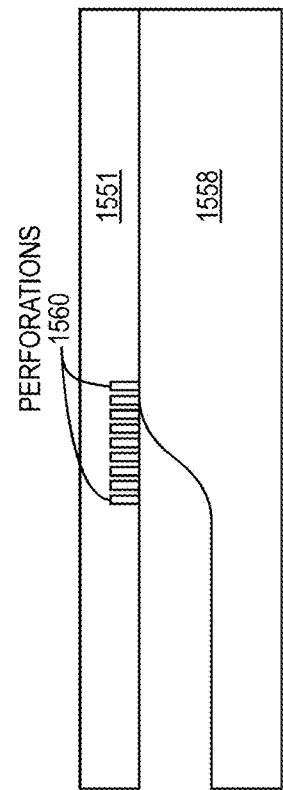
FIGS. 16A-B are side section views of the singulated preform of FIG. 15B before and after forming a 3D surface with a radius enabled by a laser perforation (defect line).
Figure 16B:
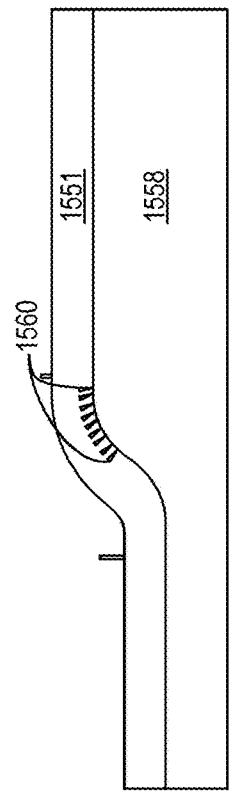

FIGS. 16A-B are side section views of the singulated preform of FIG. 15B before and after, respectively, forming a 3D surface with a radius enabled by a laser perforation. FIG. 16A illustrates the mold 1558, which has a 3D curved surface that defines 3D curvature to be applied to the surface of the part in the singulated preform 1551. The preform 1551 includes a laser perforation 1560 that facilitates bending of the preform while inducing fewer or no surface defects. FIG. 16B illustrates the same mold 1558 and preform 1551 following molding, and it can be seen that the perforation 1560 relieves bending stresses in the glass. Such laser perforations can reduce or eliminate the need for vacuum or pressure application to the preform 1551 to complete the molding.

Figure 16C:
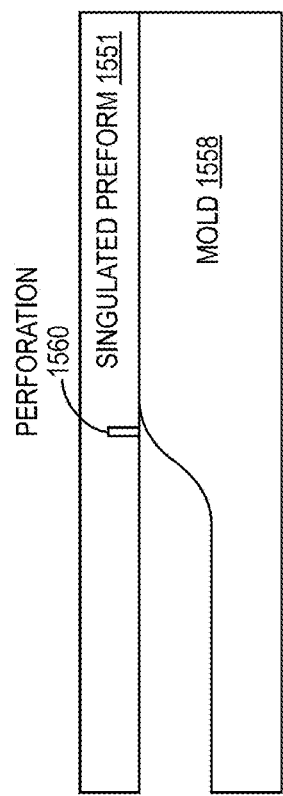
FIGS. 16C-D are corner section views of the singulated preform of FIG. 15B before and after forming a surface with a small corner radius enabled by multiple laser perforations (defect lines).
Figure 16D:
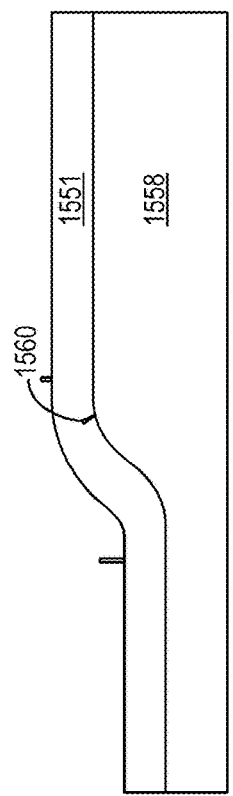

FIGS. 16C-D are corner section views of the singulated preform of FIG. 15B before and after, respectively, forming a surface with a small corner radius enabled by multiple laser perforations 1560. As illustrated in FIGS. 16C-D, particularly small radii of surface curvature, such as 5 mm or 2 mm or less, for example, can be enabled by multiple perforations. The multiple or higher-density perforations result in stress relief during molding, diminished need for vacuum or pressure application during molding, and reduced surface defects.

The methods described above provide the following benefits that may translate to enhanced laser processing capabilities and cost savings, and, thus, to lower cost manufacturing. Embodiments described above offer:

Full separation and extraction of 3D molded Gorilla® glass parts at the final size—Methods permit complete cutting and extracting of arbitrary shapes (individual or multiple) of molded 3D Gorilla® glass parts as produced by the fusion process (unstrengthened) or after the Gorilla® glass substrate has undergone chemical strengthening in a clean and controlled fashion. Full cut and separation of parts to their final size has been attained from a substrate that was pre-molded in a large radius shape by stepping down the relative position of the surface of the substrate with respect to the laser line-focus (focal line) while tracing the contour of the shape of the parts.

Reduced subsurface damage: due to the ultra-short pulse interaction between laser and material, there is little thermal interaction and thus a minimal heat affected zone that can result in undesirable stress and micro-cracking at the surface and in the subsurface region. In addition, for example, the optics that condense the laser beam into the 3D glass shape create defect lines that are typically 2 to 5 microns in diameter on the surface of the substrate.

After separation, the subsurface damage is limited to distances from the surface <75 microns in depth, for example <50 microns in depth, or even <30 microns in depth. This has great impact on the edge strength of the separated part as strength is governed by the number of defects, and their statistical distribution in terms of size and depth. The higher these numbers are, the weaker the edges of the part are and the more prone the separated part is to failure. The process enabled by the embodiments disclosed hereby can provide subsurface damage of an as-cut edge of less than 75 microns in depth, for example, less than 50 microns in depth, less than 30 microns in depth, or even 20 microns or lower in depth.

Subsurface damage, or the small microcracks and material modification caused by any cutting process and which are oriented roughly perpendicular to a cut surface, is a concern for the edge strength of glass or other brittle materials. The depth of subsurface damage can be measured by using a confocal microscope to look at the cut surface, the microscope having an optical resolution of a few nm. Surface reflections are ignored, while cracks are sought out down into the material, the cracks showing up as bright lines. The microscope is then focused into the material until there are no more "sparks", collecting images at regular intervals. The images are then manually processed by looking for cracks and tracing them through the depth of the glass to get a maximum depth (typically measured in microns) of subsurface damage. There are typically many thousands of microcracks, so typically only the largest microcracks are measured. This process is typically repeated on about 5 locations of a cut edge. Although the microcracks are roughly perpendicular to the cut surface, any cracks that are directly perpendicular to the cut surface may not be detected by this method.

Process cleanliness—The methods described above are capable of separating/cutting 3D glass shape in a clean and controlled fashion. It is very challenging to use conventional ablative or thermal laser processes because they tend to trigger heat affected zones that induce micro-cracks and fragmentation of the glass or other substrate into several smaller pieces. The characteristics of the laser pulses and the induced interactions with the material of the disclosed methods can avoid all of these issues because they occurs in a very short time scale and because the transparency of the substrate material to the laser radiation minimizes induced thermal effects. Since the defect line is created within the object or workpiece, the presence of debris and particulate matter during the cutting step is virtually eliminated. If there are any particulates resulting from the created defect line, they are well contained until the part is separated. Particles on surfaces cut and separated by the laser-based methods described herein can have an average diameter less than about 3 microns, for example.

Cutting Complex Profiles and Shapes in Different Sizes

The present laser processing method allows for cutting/separation of glass and other substrates or workpieces following many forms and shapes, which is a limitation in other competing technologies. Tight radii (e.g., <2 mm or <5 mm) may be cut using the methods described herein, allowing curved edges. Also, since the defect lines strongly control the location of any crack propagation, this method gives great control to the spatial location of a cut, and allows for cutting and separation of structures and features as small as a few hundred microns.

Elimination of Process Steps

The process to fabricate parts (e.g., arbitrarily shaped glass plates from the incoming glass panel) to the final size and shape involves several steps that encompass cutting the panel, cutting to size, finishing and edge shaping, thinning the parts down to their target thickness, polishing, and even chemically strengthening in some cases. Elimination of any of these steps will improve manufacturing cost in terms of process time and capital expense. The presented methods can reduce the number of steps by, for example, reducing generation of debris and edge defects, potentially eliminating the need for washing and drying stations. Furthermore, the number of steps can be reduced by, for example, cutting the sample directly to its final size, shape and thickness, eliminating a need for finishing lines.

Cutting Stacks:

The process is also capable of creating vertical defect lines in stacked glass panels. There is a limitation to the height of the stack, but it is possible to increase productivity by simultaneously processing multiple stacked plates. It requires that the material be substantially transparent to the laser wavelength, which is the case for 3D glass shapes at the laser wavelength used here (1064 nm).

The relevant teachings of all patents, published applications and references cited herein are incorporated by reference in their entirety.

While exemplary embodiments have been disclosed herein, it will be understood by those skilled in the art that various changes in form and details may be made therein without departing from the scope of the invention encompassed by the appended claims.

What is claimed is:

1. A glass article having a 3D surface, the glass article having at least one edge having a plurality of defect lines extending at least 250 microns, the defect lines each having a diameter less than or equal to about 5 microns.

2. The glass article of claim 1, wherein the glass article comprises strengthened glass.

3. The glass article of claim 1, wherein the glass article comprises unstrengthened glass.

4. The glass article of claim 1, wherein the edge has an Ra surface roughness less than about 0.5 microns.

5. The glass article of claim 1, wherein the edge has subsurface damage up to a depth less than or equal to about 75 microns.

6. The glass article of claim 1, wherein a distance between the defect lines is less than or equal to about 7 microns.

7. The glass article of claim 1, wherein the at least one edge defines a thickness of the glass article, each of the plurality of defect lines extending over the thickness of the glass article.

* * * * *

UNITED STATES PATENT AND TRADEMARK OFFICE
CERTIFICATE OF CORRECTION

PATENT NO. : 10,392,290 B2  
APPLICATION NO. : 15/662788  
DATED : August 27, 2019  
INVENTOR(S) : Sasha Marjanovic et al.

Page 1 of 1

It is certified that error appears in the above-identified patent and that said Letters Patent is hereby corrected as shown below:

On page 4, Column 2, item (56), other publications, Line 4, delete "achitecture" and insert -- architecture --, therefor.

On page 5, Column 1, item (56), other publications, Line 28, delete "Egineering" and insert -- Engineering --, therefor.

On page 5, Column 2, item (56), other publications, Line 11, delete "Proccessing" and insert -- Processing --, therefor.

On page 6, Column 2, item (56), other publications, Line 12, delete "pluse" and insert -- pulse --, therefor.

Signed and Sealed this  
Twenty-fifth Day of February, 2020

Andrei Iancu  
*Director of the United States Patent and Trademark Office*